United States Patent
Montalvo et al.

(10) Patent No.: US 8,594,583 B2
(45) Date of Patent: Nov. 26, 2013

(54) APPARATUS AND METHOD FOR RADIO FREQUENCY RECEPTION WITH TEMPERATURE AND FREQUENCY INDEPENDENT GAIN

(75) Inventors: Antonio Montalvo, Raleigh, NC (US); David McLaurin, Durham, NC (US); Oliver Gysel, Raleigh, NC (US)

(73) Assignee: Analog Devices, Inc., Norwood, MA (US)

( * ) Notice: Subject to any disclaimer, the term of this patent is extended or adjusted under 35 U.S.C. 154(b) by 323 days.

(21) Appl. No.: 12/964,479

(22) Filed: Dec. 9, 2010

(65) Prior Publication Data

US 2012/0149321 A1   Jun. 14, 2012

(51) Int. Cl.
*H04B 1/00* (2006.01)

(52) U.S. Cl.
USPC ....... 455/69; 455/127.2; 455/126; 455/127.1; 455/522; 455/127.5; 327/3; 330/149

(58) Field of Classification Search
USPC .......... 455/69, 127.2, 126, 127.1, 522, 127.5; 327/3; 330/149
See application file for complete search history.

(56) References Cited

U.S. PATENT DOCUMENTS

| | | | |
|---|---|---|---|
| 3,727,078 A | 4/1973 | Wollesen | |
| 4,063,179 A | 12/1977 | Brown | |
| 4,399,559 A | 8/1983 | Theriault | |
| 4,619,001 A | 10/1986 | Kane | |
| 4,980,810 A | 12/1990 | McClanahan et al. | |
| 5,121,084 A | 6/1992 | Anderson et al. | |
| 5,553,319 A | 9/1996 | Tanbakuchi | |
| 5,710,981 A * | 1/1998 | Kim et al. | ........ 455/69 |
| 5,867,061 A | 2/1999 | Rabjohn et al. | |
| 5,959,499 A * | 9/1999 | Khan et al. | ..... 330/149 |

(Continued)

FOREIGN PATENT DOCUMENTS

| | | |
|---|---|---|
| CA | 2374784 | 6/2003 |
| CA | 2374794 | 6/2003 |

OTHER PUBLICATIONS

Analog Devices, "AD9352: WiMAX/WiBro RF MxFE Transceiver," Aug. 2007, available at http://www.analog.com/en/rfif-components/rfif-transceivers/ad9352/products/product.html.

(Continued)

*Primary Examiner* — April G Gonzales
(74) *Attorney, Agent, or Firm* — Knobbe, Martens, Olson & Bear LLP

(57) ABSTRACT

Apparatus and methods are disclosed, such as those involving an RF receiver. One such apparatus includes a front end having an input and an output. The front end forms part of an RF signal receive path. The front end includes a front-end resistor configured to receive an input signal; and a passive mixer downstream of the front-end resistor on the receive path. The passive mixer mixes the input signal with a local oscillation signal. The front-end includes a transimpedance amplifier located downstream of the passive mixer on the receive path. The transimpedance amplifier includes an input and an output. The front end further includes a feedback resistor coupled between the input and output of the transimpedance amplifier. The gain of the front end is a ratio of the feedback resistance to the front-end resistance, and is temperature- and frequency-insensitive. The apparatus also provides relatively constant input impedance and high linearity.

41 Claims, 14 Drawing Sheets

(56) References Cited

U.S. PATENT DOCUMENTS

| | | | |
|---|---|---|---|
| 6,009,318 | A | 12/1999 | Freed |
| 6,337,974 | B1* | 1/2002 | Inamori et al. ............... 455/126 |
| 6,650,180 | B2 | 11/2003 | Lautzenhiser et al. |
| 6,653,885 | B2 | 11/2003 | Wu et al. |
| 6,683,499 | B2 | 1/2004 | Lautzenhiser et al. |
| 6,690,238 | B2 | 2/2004 | Lautzenhiser et al. |
| 6,711,395 | B1 | 3/2004 | Tonegawa et al. |
| 6,747,517 | B2 | 6/2004 | Lautzenhiser et al. |
| 6,900,696 | B2 | 5/2005 | Lautzenhiser et al. |
| 6,922,106 | B2 | 7/2005 | Lautzenhiser et al. |
| 7,053,718 | B2 | 5/2006 | Dupuis et al. |
| 7,072,636 | B2 | 7/2006 | Dobrovolny |
| 7,190,229 | B1 | 3/2007 | Lautzenhiser et al. |
| 7,215,206 | B2 | 5/2007 | Dupuis et al. |
| 7,418,244 | B2* | 8/2008 | Montalvo ................... 455/127.2 |
| 7,570,116 | B2 | 8/2009 | Haila et al. |
| 7,944,307 | B2 | 5/2011 | Goldfarb et al. |
| 2007/0194804 | A1 | 8/2007 | Kase et al. |
| 2008/0024229 | A1 | 1/2008 | Dupuis et al. |
| 2009/0088124 | A1* | 4/2009 | Schuur et al. ............... 455/341 |
| 2009/0176467 | A1 | 7/2009 | Im et al. |
| 2010/0301943 | A1 | 12/2010 | Goldfarb |
| 2011/0279147 | A1* | 11/2011 | Montalvo et al. ............ 327/3 |
| 2012/0314811 | A1 | 12/2012 | Goldfarb |

OTHER PUBLICATIONS

Analog Devices, "AD-9352-5: WiMAX RF MxFE Transceiver," Oct. 2008, available at http://www.analog.com/en/rfif-components/rfif-transceivers/ad9352-5/products/product.html.

Analog Devices, "AD-9353: WiMAX RF MxFE™ Transceiver," Oct. 2007, available at http://www.analog.com/en/rfif-components/rfif-transceivers/ad9353/products/product.html.

Analog Devices, "AD-9354: WiMAX/WiBRO RF MxFE™ MISO Transceiver," Mar. 2009, available at http://www.analog.com/en/rfif-components/rfif-transceivers/ad9354/products/product.html.

Analog Devices, "AD-9355: WiMAX RF MxFE™ Transceiver," Apr. 2009, available at http://www.analog.com/en/rfif-components/rfif-transceivers/ad9355/products/product.html.

Analog Devices, "AD9356 Data Sheet," 2 pages, Jan. 2010.

Analog Devices, "AD-9356: Integrated MIMO Transceiver," Jan. 2010, available at http://www.analog.com/en/rfif-components/rfif-transceivers/ad9356/products/product.html.

Analog Devices, "AD-9357: WiMAX/BWA/LTE RF MxFE 2×2 Transceiver," Apr. 2010, available at http://www.analog.com/en/rfif-components/rfif-transceivers/ad9357/products/product.html.

Gilbert, Barrie. The Micromixer: A Highly Linear Variant of the Gilbert Mixer Using a Bisymmetric Class-AB Input Stage, IEEE Journal of Solid-State Circuits, vol. 32, No. 9, Sep. 1997, pp. 1412-1423.

\* cited by examiner

APPARATUS AND METHOD FOR RADIO FREQUENCY RECEPTION WITH TEMPERATURE AND FREQUENCY INDEPENDENT GAIN

BACKGROUND

1. Field

Embodiments of the invention relate to electronic devices, and more particularly, in one or more embodiments, to radio frequency receivers.

2. Description of the Related Technology

Recently, many electronic systems have employed wireless capability. Such electronic systems can include a wireless receiver that processes a wireless signal (for example, a radio frequency signal) received via a wireless medium, such as air. A wireless receiver can include various components to amplify and/or filter a wireless signal to recover original data carried by the wireless signal.

Referring to FIG. 1, a conventional wireless radio frequency (RF) receiver system will be described below. The illustrated system 100 includes an antenna 101, an input stage structure 110, an input matching network 120, a low noise amplifier 130, a first transconductor 140a, a second transconductor 140b, a first mixer 150a, a second mixer 150b, a first local oscillator 160a, a second local oscillator 160b, a first low pass filter 170a, a second low pass filter 170b, a first analog-to-digital converter (ADC) 180a, a second analog-to-digital converter (ADC) 180b, and a digital processor 190.

The antenna 101 is configured to receive a wireless signal. The antenna 101 can be any suitable antenna for wireless signal reception. The antenna 101 provides the received wireless signal to the input stage structure 110.

The input stage structure 110 serves to receive the wireless signal from the antenna 101 and process the wireless signal. The input stage structure 110 can include, for example, an antenna interface circuit to interface with the antenna 101, and a filter (for example, a band pass filter) to filter signals outside of a signal band of interest. The input stage structure 110 provides the processed signal to the input matching network 120.

The input matching network 120 serves to improve power transfer from the input stage structure 110 to the low noise amplifier 130, and to reduce signal reflection by the low noise amplifier 130. Further, the input matching network 120 can serve to improve the noise performance of the low noise amplifier 130. The input matching network 120 is configured to match the impedance of the low noise amplifier 130 with the impedance of the structure (for example, the input stage structure 110 and the antenna 101) on the opposite side of the input matching network 120 from the low noise amplifier 130. The input matching network 120 receives the processed signal from the input stage structure 110, and provides it to the low noise amplifier 130.

The low noise amplifier 130 serves to amplify the signal from the input matching network 120, and provides the amplified signal to the first and second transconductors 140a, 140b. The low noise amplifier 130 is configured to amplify a relatively weak signal with a gain such the effect of noise on subsequent stages of the receiver system 100 is reduced.

Each of the first and second transconductors 140a, 140b serves to convert the amplified signal in voltage form into a current signal. The first and second transconductors 140a, 140b provide the current signals to the first and second mixers 150a, 150b.

The first mixer 150a serves to mix the current signal from the first transconductor 140a and a first local frequency signal from the first local oscillator 160a to generate a first mixed signal. The first mixed signal can include the fundamental frequencies of the current signal, the first local frequency signal, harmonics thereof, and intermodulation products. The second mixer 150b serves to mix the current signal from the second transconductor 140b and a second local frequency signal from the second local oscillator 160b to generate a second mixed signal. The second mixed signal can include the fundamental frequencies of the current signal, the second local frequency signal, harmonics thereof, and intermodulation products. The mixers 150a, 150b can be biased active mixers.

In the illustrated example in which a quadrature amplitude modulation (QAM) technique is used, the first local frequency signal can be used to process in-phase (I) components of the received wireless signal while the second local frequency signal can be used to process quadrature (Q) components of the received wireless signal. The first and second local frequency signals can have a phase difference of about 90 degrees from each other.

The first and second low pass filters 170a, 170b serve to filter the first and second mixed signals, respectively, and provide the filtered signals to the first and second analog-to-digital converters 180a, 180b, respectively. The first and second low pass filters 170a, 170b can select a desired intermediate frequency (IF) and block undesired frequencies. In another embodiment, the first and second low pass filters 170a, 170b can be replaced with band pass filters.

The first and second analog-to-digital converters 180a, 180b serve to convert the filtered signals from analog form into digital signals. The first and second analog-to-digital converters 180a, 180b can provide the digital signals to the digital processor 190.

The digital processor 190 serves to receive the digital signals from the first and second analog-to-digital converters 180a, 180b, and perform digital signal processing on the digital signals. The digital signal processing can include, for example, demultiplexing and decoding.

SUMMARY

In one embodiment, an apparatus includes a front end having an input and an output. The front end forms at least part of a radio frequency (RF) signal receive path, and includes a front-end resistor of the receive path. The front-end resistor is configured to receive an input signal from the input of the front end. The front end also includes a passive mixer located downstream of the front-end resistor in the receive path. The passive mixer is configured to mix the input signal from the front-end resistor with a local oscillation signal, wherein the passive mixer is not coupled to a voltage reference for biasing. The front end further includes a transimpedance amplifier located downstream of the passive mixer on the receive path; and a feedback resistor coupled between an input and an output of the transimpedance amplifier.

In another embodiment, an apparatus includes a front end for processing a radio frequency (RF) signal. The front end includes a front-end resistor configured to convert a voltage signal to generate a current signal; a mixer configured to pass the current signal at least partly in response to one or more local oscillation signals, wherein the mixer is not coupled to a voltage reference for biasing; a transimpedance amplifier configured to amplify the current signal from the mixer to generate an amplified voltage signal; and a feedback resistor configured to feed the amplified voltage signal back to an input of the transimpedance amplifier.

In yet another embodiment, an electronic device includes a receive path to receive and process a wireless signal. The receive path includes an input resistor having a first end and a second end. The first end is configured to receive an input signal. The receive path also includes a switch having a first terminal and a second terminal. The first terminal is electrically coupled to the second end of the input resistor, wherein the switch is configured to receive the input signal from the input resistor, and to selectively pass the input signal at least partially in response to a local oscillation signal. The receive path further includes a transimpedance amplifier having an input and an output. The input of the transimpedance amplifier is electrically coupled to the second terminal of the switch. The receive path further includes a feedback resistor coupled between the input and output of the transimpedance amplifier.

In yet another embodiment, a method includes processing an input signal through a front end of a radio frequency (RF) receive path. Processing the input signal comprises: passing the input signal through a front-end resistor to generate a passed input signal; mixing the passed input signal with a local oscillation signal to generate a mixed signal, wherein mixing is performed by a passive mixer; amplifying the mixed signal, using a transimpedance amplifier having an input and an output, to generate an amplified signal at the output; and providing the amplified signal to the input of the transimpedance amplifier through a feedback resistor. The front end has a gain based at least partly on a ratio of the resistance of the feedback resistor to the resistance of the front-end resistor. The gain is substantially temperature insensitive.

DETAILED DESCRIPTION OF EMBODIMENTS

Figure 1:
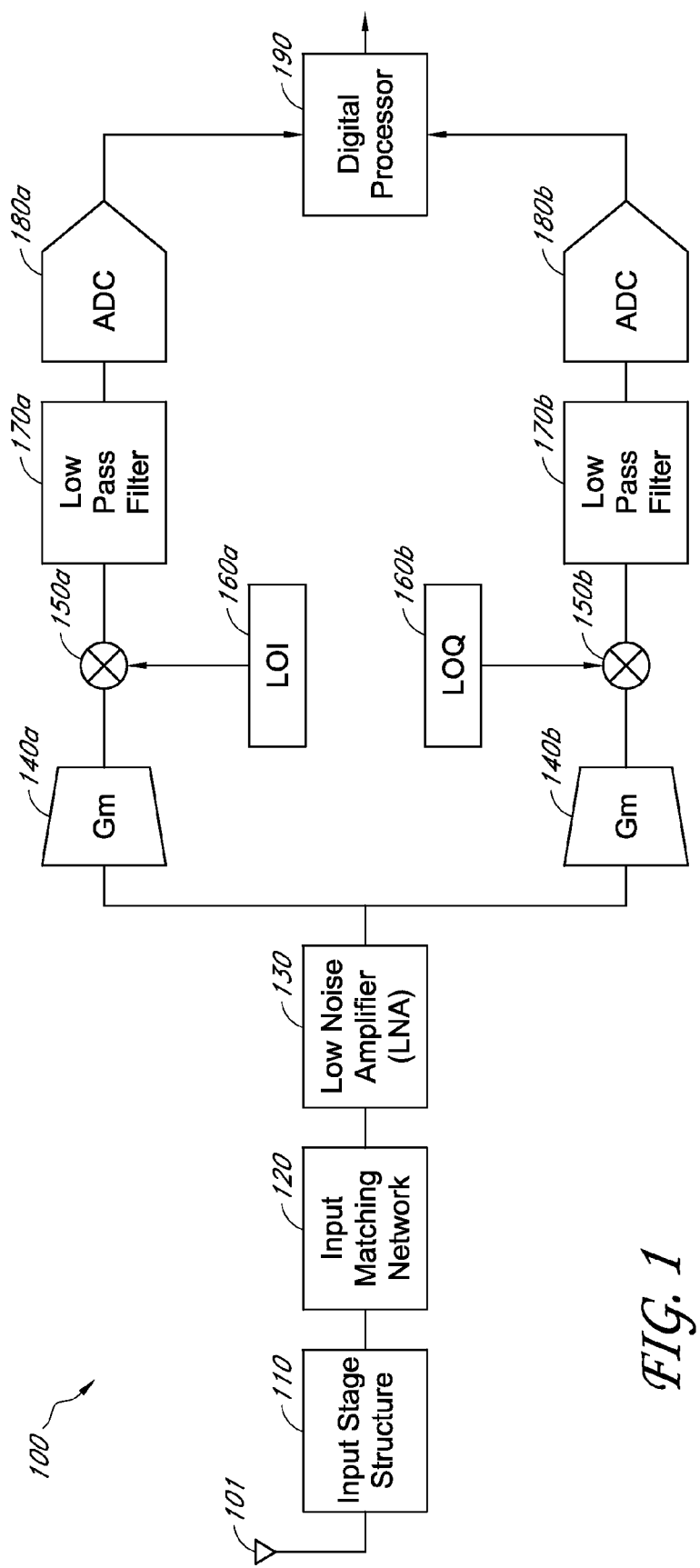
FIG. 1 is a schematic block diagram illustrating a conventional radio frequency (RF) receiver.

The following detailed description of certain embodiments presents various descriptions of specific embodiments of the invention. However, the invention can be embodied in a multitude of different ways as defined and covered by the claims. In this description, reference is made to the drawings where like reference numerals indicate identical or functionally similar elements.

Overview of RF Receiver with Temperature and Frequency Independent Gain

In certain applications, it is desirable that an RF receiver has a temperature and/or frequency independent gain. For example, an RF transmit power detector, which can use a portion of an RF receiver, should be able to make accurate measurements of power without recalibration during operation, despite temperature and/or frequency changes. A wideband receiver also needs to provide a frequency insensitive gain when the transmitter frequency is highly programmable.

In addition, certain RF receivers can be implemented, using deep sub-micron technologies in which power supply voltages are relatively low (for example, about 1.3 V). In such instances, bias circuits and active mixers are difficult to implement while occupying a relatively large area on a chip. Thus, there is a need for providing an RF receiver that can be easily implemented with such low supply voltages of deep sub-micron technologies while having a relatively small size.

In one embodiment, an RF receiver can include a front end, which includes a variable resistor, a passive mixer, and a transimpedance amplifier with one or more feedback resistors in sequence on a receive path. The front end can have a gain which is proportional to a ratio of the resistances of the feedback resistors and the variable resistor. Further, the RF receiver can include an input matching network that can provide substantially constant input impedance, regardless of the gain setting of the front end.

The variable resistor and the feedback resistors can track each other over temperature changes, and thus the gain of the front end can be relatively insensitive to temperature variation. Further, the variable resistor and the passive mixer can have a relatively low capacitance, which makes the front end relatively frequency-insensitive, compared with a conventional RF receiver with an LNA and transconductors which typically have non-linear capacitive elements (such as gate capacitance).

Figure 2:
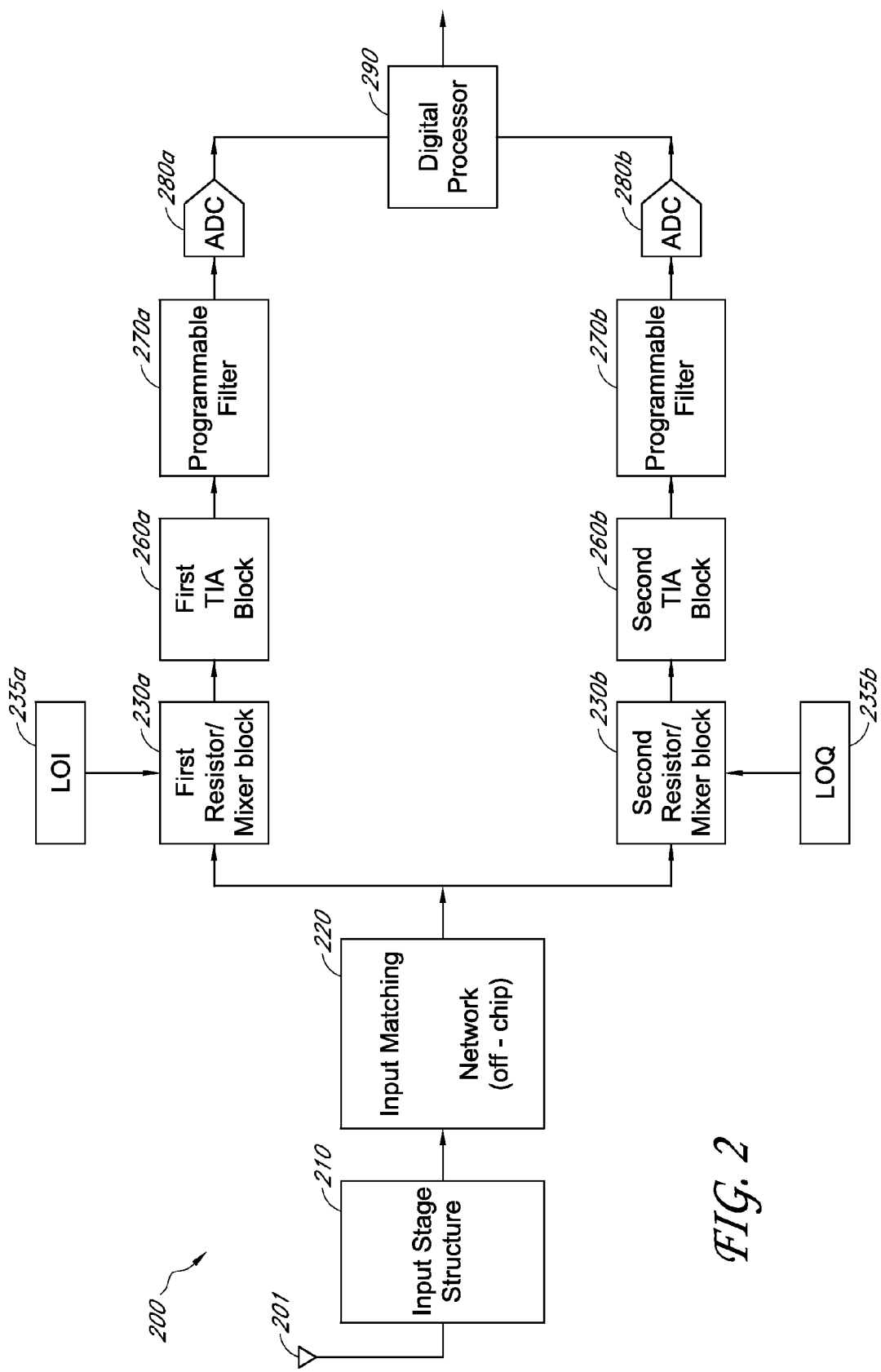
FIG. 2 is a schematic block diagram illustrating a radio frequency (RF) receiver according to one embodiment.

Referring to FIG. 2, an RF receiver system according to one embodiment will be described below. The illustrated system 200 includes an antenna 201, an input stage structure 210, an input matching network 220, a first resistor/mixer block 230a, a second resistor/mixer block 230b, a first local oscillator 235a, a second local oscillator 235b, a first transimpedance amplifier (TIA) block 260a, a second TIA block 260b, a first programmable filter 270a, a second programmable filter 270b, a first analog-to-digital converter (ADC) 280a, a second ADC 280b, and a digital processor 290. The first and second resistor/mixer blocks 230a, 230b, and the first and second TIA blocks 260a, 260b can be collectively referred to as a "front end."

The illustrated receiver system 200 includes the input matching network 220, the first and second resistor/mixer blocks 230a, 230b and the first and second TIA blocks 260a, 260b in place of the input matching network 120, the low noise amplifier 130, the transconductors 140a, 140b, and the mixers 150a, 150b in the receiver system 100 of FIG. 1. Details of the input matching network 220, the first and second resistor/mixer blocks 230a, 230b, and the first and second TIA blocks 260a, 260b will be described later in connection with FIGS. 3-6.

The first and second programmable filters 270a, 270b serve to filter signals from the first and second TIA blocks 260a, 260b, respectively, and provide the filtered signals to the first and second ADCs 280a, 280b, respectively. The first and second filters 270a, 270b can select a desired intermediate frequency (IF) and block undesired frequencies, and can be band pass or low pass filters. Details of the antenna 201, the input stage structure 210, the first local oscillator 235a, the second local oscillator 235b, the first ADC 280a, the second ADC 280b, and the digital processor 290 can be as described above in connection with FIG. 1. In addition, a single oscillator can be used for the first local oscillator 235a and the second local oscillator 235b. A phase shift between outputs can be used to generate a signal 90° phase shifted from another.

In one embodiment, the input matching network 220 of the receiver system 200 can be implemented separate from a chip including the components downstream of the input matching network 220. Such a configuration can be referred to as an "off-chip" configuration in the context of this document. In other embodiments, the input matching network 220 can be entirely or partially on the chip.

Front End with Temperature and Frequency Independent Gain

Figure 3:
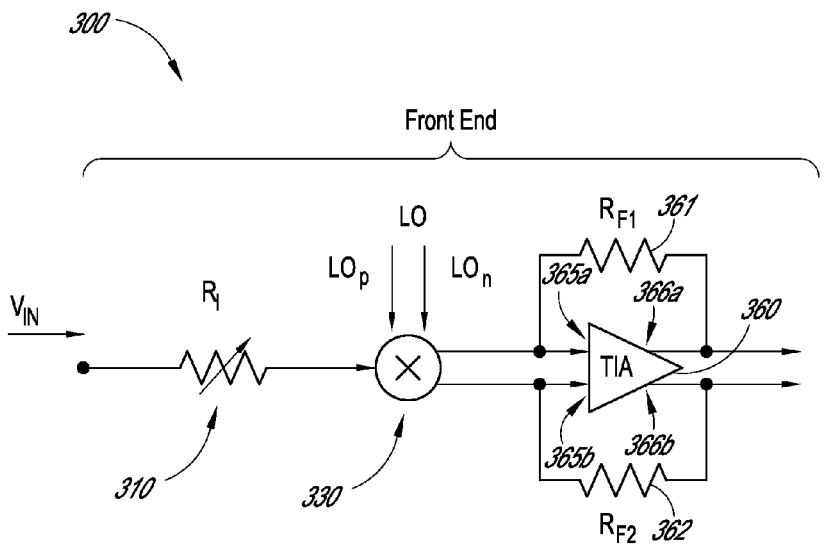
FIG. 3 is a schematic circuit diagram of a front end of an RF receiver, including a variable resistor, a passive mixer, and a transimpedance amplifier according to one embodiment.

Referring to FIG. 3, a front end of a receiver system according to one embodiment will be described below. The illustrated front end 300 can form at least part of a receiver system such as the receiver system of FIG. 2. In one embodiment, the front end 300 can form at least part of (i) the first resistor/mixer block 230a and the first TIA block 260a and/or (ii) the second resistor/mixer block 230b and the second TIA block 260b of FIG. 2. The front end 300 can include a variable input resistor 310, a passive mixer 330, a transimpedance amplifier (TIA) 360, and first and second feedback resistors 361, 362.

The input resistor 310 can serve as a transconductor, and is configured to receive an input signal $V_{in}$ (in the form of a voltage signal) from a component upstream of the input resistor 310 (for example, the off-chip input matching network 220 of FIG. 2), and convert the input signal $V_{in}$ to a current which is passed to the passive mixer 330. The input resistor 310 can have a resistance $R_I$ ranging between about 50Ω and about 100 kΩ, for example, up to about 8 kΩ or 9 kΩ. A skilled artisan will, however, appreciate that the resistance of the input resistor 310 can vary widely, depending on the design of the front end 300, and an applicable value will be readily determined by one of ordinary skill in the art. In one embodiment, the input resistor 310 can be formed by one or more polysilicon resistors.

The passive mixer 330 serves to mix the current from the input resistor 310 with a local oscillation signal LO. The passive mixer 330 thus multiplies the current with the local oscillation signal LO. The passive mixer 330 can be implemented by one or more switches, which do not need to be biased by, for example, a power supply rail. In one embodiment, the passive mixer 330 has one or more FET transistors with no biasing circuits or coupling to voltage references for biasing.

In one embodiment, the local oscillation signal LO can include a p-component local oscillation signal LOp and an n-component local oscillation signal LOn which can be complementary to each other. In some embodiments, each of the p-component local oscillation signal LOp and the n-component local oscillation signal LOn can be a square wave signal or a sine wave signal.

The mixer 330 outputs either a p-component mixed signal or an n-component mixed signal to inputs of the transimpedance amplifier 360. The mixer 330 can have a relatively low impedance. In the illustrated embodiment, the mixer 330 is a single balanced version. The switches of the mixer 330 can be sized for desired bandwidth and linearity characteristics. In other embodiments, the mixer 330 can be adapted for a differential signaling or fully balanced signaling scheme.

The transimpedance amplifier 360 serves to receive the mixed signals in the form of a current signal at its inputs, and convert the mixed signals to generate amplified voltage signals as an output to a component downstream of the amplifier 360 (for example, the programmable filter 270a, 270b of FIG. 2). The transimpedance amplifier 360 can include any suitable transimpedance amplifier. The transimpedance amplifier 360 receives a p-component signal at the first input 365a, and generates an n-component output signal at the first output 366a. The transimpedance amplifier 360 also receives an n-component signal at the second input 365a, and generates a p-component output signal at the second output 466b.

The first and second feedback resistors 361, 362 serve to form a feedback loop around the transimpedance amplifier 360. Each of the first and second feedback resistors 361, 362 has a first end electrically coupled to a respective one of the inputs 365a, 365b of the amplifier 360, and a second end electrically coupled to a respective one of the outputs 366a, 366b of the amplifier 360. In one embodiment, each of the first and second feedback resistors 361, 362 can have a resistance $R_{F1}$ or $R_{F2}$ between about 500Ω and about 100 kΩ. A skilled artisan will, however, appreciate that the resistances of the feedback resistors 361, 362 can vary widely, depending on the design of the front end 300, and will readily determine an applicable value. The first and second feedback resistors 361, 362 can have substantially the same resistance as each other, and the resistance of the first or second feedback resistor 361, 362 can be denoted as $R_F$ in the context of this document. In one embodiment, the feedback resistors 361, 362 can be formed by one or more polysilicon resistors.

A resistor typically has temperature dependence represented by Equation 1 below.

$$R=R_0[1+\alpha(T-T_0)] \hspace{2cm} \text{Equation 1}$$

In Equation 1, T is temperature, $T_0$ is a reference temperature (usually room temperature), $R_0$ is the resistance at $T_0$, and α is a constant indicating the percentage change in resistivity per unit temperature. The constant α depends on the material used for the resistor.

In view of Equation 1, the feedback resistor 361 or 362 has temperature dependence represented by $R_F=R_{F0}[1+\alpha(T-T_0)]$, and the input resistor 310 has temperature dependence represented by $R_I=R_{I0}[1+\alpha(T-T_0)]$.

In the illustrated embodiment, the front end 300 has a gain expressed by a ratio of $R_F$ to $R_f$ scaled by $2/\pi$ due to mixing, i.e., gain=$(2/\pi)\times(R_F/R_f)$. It will be understood that the relationship can be approximate. In an embodiment in which the input resistor 310 and the feedback resistors 361, 362 are formed of the same material, a ratio of $R_F$ to $R_f$ is equal to $R_{F0}[1+\alpha(T-T_0)]/R_{f0}[1+\alpha(T-T_0)]$, which is equal to $R_{F0}/R_{f0}$. Thus, the ratio of $R_F$ to $R_1$ is temperature independent, resulting in a temperature-independent front end gain.

In addition, the front end 300 includes the input resistor 310 and the passive mixer 330, while not including an actively-biased component on the same chip for the mixer 330, and thus has a relatively low capacitance on the chip, compared with the conventional receiver system 100 of FIG. 1. An active component is typically biased (while having capacitive elements), and has a non-linearity, depending on the frequency of the input signal. Thus, the front end 300 is less susceptible to the frequency of the input signal than those with biasing components, such as the front end of the conventional receiver of FIG. 1, which has a LNA, transconductors, and active mixers.

Figure 4A:
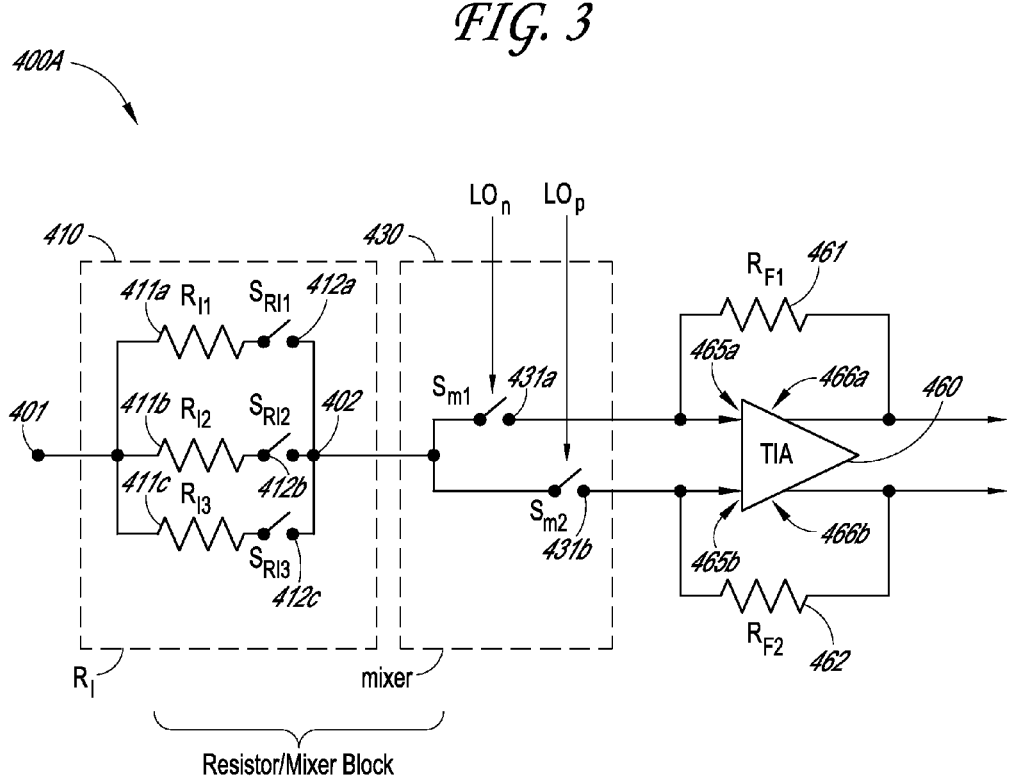
FIG. 4A is a schematic circuit diagram of the front end of FIG. 3 according to one embodiment.

Referring to FIG. 4A, a front end having a variable input resistor and a passive mixer according to one embodiment will be described below. In the illustrated embodiment, the front end 400A includes a variable input resistor block 410, a passive mixer 430, a transimpedance amplifier 460, and first and second feedback resistors 461, 462. The transimpedance amplifier 460 can have a first input 465a, a second input 465b, a first output 466a, and a second output 466b. Other details of the transimpedance amplifier 460, and the first and second feedback resistors 461, 462 can be as described above with respect to the transimpedance amplifier 360 and the first and second feedback resistors 361, 362 in connection with FIG. 3.

The input resistor block 410 can include a first input resistor 411a, a second input resistor 411b, a third input resistor 411c, a first input switch 412a, a second input switch 412b, and a third input switch 412c. The first input resistor 411a has a first end electrically coupled to a first node 401, and a second end electrically coupled to the first input switch 412a. The second input resistor 411b has a first end electrically coupled to the first node 401, and a second end electrically coupled to the second input switch 412b. The third input resistor 411c has a first end electrically coupled to the first node 401, and a second end electrically coupled to the third input switch 412c. In other embodiments, the number of sets of input resistors and switches can vary widely, depending on the design of the circuit. In some embodiments, the input resistors 411a-411c can have substantially the same resistance as one another. In such embodiments, the resistors can be referred to as "unit resistors."

Each of the first to third input switches 412a-412c is also electrically coupled to a second node 402, and can include any suitable switching component, for example, a metal oxide semiconductor (MOS) field effect transistor (FET). The first to third input switches 412a-412c can be controlled by one or more control signals provided by a controller (not shown).

The passive mixer 430 can include a first mixer switch 431a and a second mixer switch 431b. The first mixer switch 431a is electrically coupled between the second node 402 and the first input 465a of the transimpedance amplifier 460. The first mixer switch 431a is configured to receive a first local oscillation signal LOn as a switching control signal, and to generate an n-component mixed signal in response to the first local oscillation signal LOn. The second mixer switch 431b is electrically coupled between the second node 402 and the second input 465b of the transimpedance amplifier 460. The second mixer switch 431b is configured to receive a second local oscillation signal LOp as a switching control signal, and to generate a p-component mixed signal in response to the second local oscillation signal LOp. In one embodiment, each of the first and second mixer switches 431a, 431b can be implemented with a MOSFET having a source electrically coupled to the second node 402, a drain electrically coupled to a respective one of the inputs 465a, 465b of the transimpedance amplifier 460, and a gate configured to receive one of the local oscillation signals LOp, Lon, as shown in FIG. 4C.

During operation, the gain of the front end 400A can be adjusted by switching on or off one or more of the first to third input switches 412a-412c to select the number of input resistors 411a-411c electrically coupled to the transimpedance amplifier 460 through the passive mixer 430.

Figure 4B:
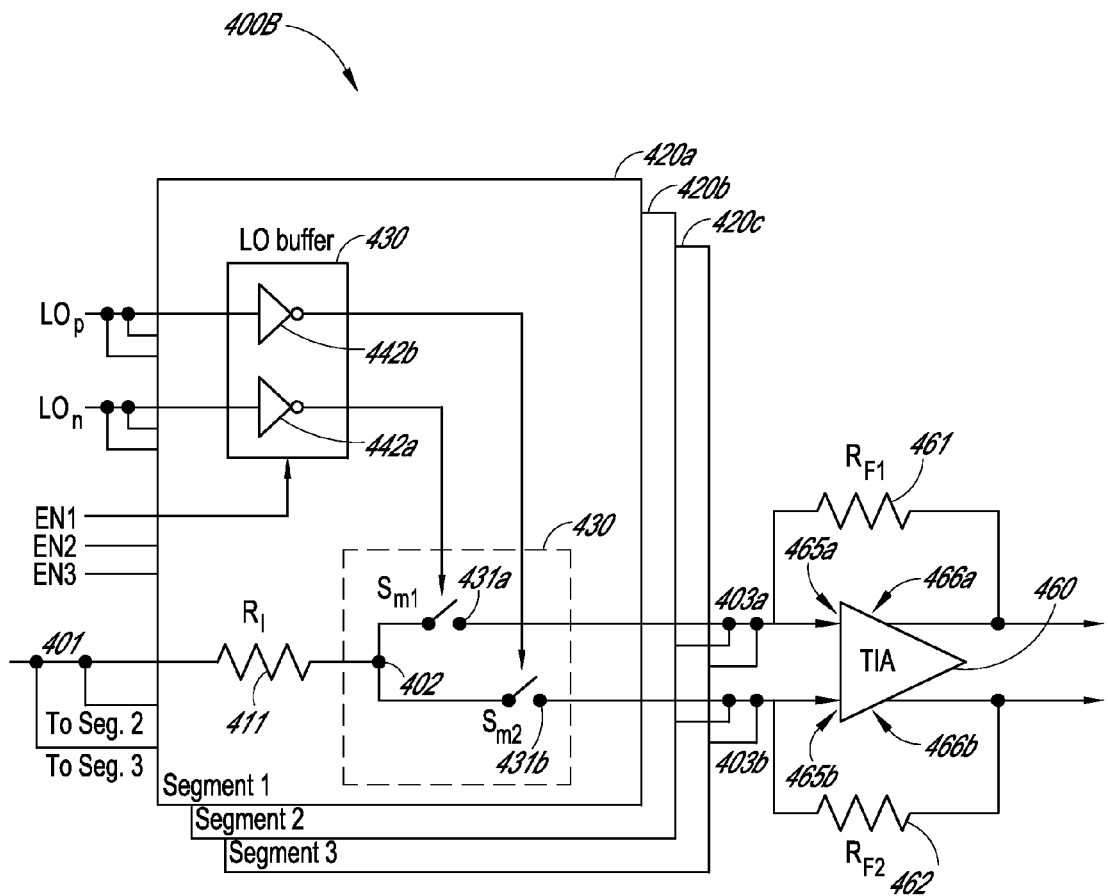
FIG. 4B is a schematic circuit diagram of the front end of FIG. 3 according to another embodiment.
Figure 4C:
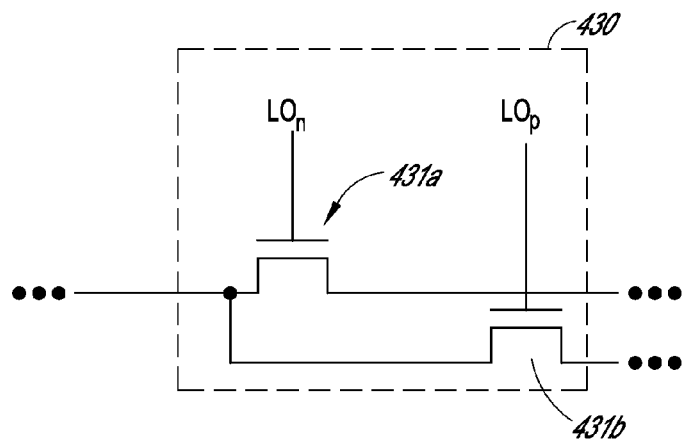
FIG. 4C is a schematic circuit diagram of the passive mixer of the front end of FIG. 4A according to one embodiment.

Referring to FIG. 4B, a front end having a variable input resistor and a passive mixer according to another embodiment will be described below. In the illustrated embodiment, the front end 400B includes first to third resistor/mixer segments 420a-420c, a transimpedance amplifier 460, and first and second feedback resistors 461, 462. The transimpedance amplifier 460 can have a first input 465a, a second input 465b, a first output 466a, and a second output 466b. Other details of the transimpedance amplifier 460 and the first and second feedback resistors 461, 462 can be as described above with respect to the transimpedance amplifier 360 and the first and second feedback resistors 361, 362 in connection with FIG. 3.

In the illustrated embodiment, the multiple segments 420a-420c can be selectively switched on, depending on the desired gain, thereby enhancing the gain programmability of the front end 400B. Each of the first to third segments 420a-420c can include a resistor 411, a passive mixer 430, and a local oscillator (LO) buffer 435. While FIG. 4B illustrates three segments, a skilled artisan will appreciate that the number of the segments can vary widely, depending on the design of the front end.

The resistor 411 can have a first end electrically coupled to a first node 401 and a second end electrically coupled to the passive mixer 430 via a second node 402. Other details of the resistor 411 can be as described above with respect to the resistors 411a-411c of FIG. 4A.

The passive mixer 430 can include a first mixer switch 431a and a second mixer switch 431b. The first mixer switch 431a is electrically coupled between the second node 402 and the first input 465a of the transimpedance amplifier 460, and is configured to receive a first local oscillation signal LOn as a switching control signal from the LO buffer 435 to generate an n-component mixed signal. The second mixer switch 431b is electrically coupled between the second node 402 and the second input 465b of the transimpedance amplifier 460, and is configured to receive a second local oscillation signal LOp as a switching control signal from the LO buffer 435 to generate a p-component mixed signal.

The LO buffer 435 includes a first inverter 442a and a second inverter 442b, which receive and invert the first local oscillation signal LOn and the second local oscillation signal LOp, respectively, and provide them to the mixer 430. In an alternative embodiment, the LO buffer 435 is implemented with non-inverting buffers. The LO buffer 435 is configured to receive a respective one of enable signals EN1, EN2, EN3 from a controller. In some embodiments, the local oscillation signals LOp, LOn can optionally be AC coupled to accommodate a common mode voltage larger than $V_{DD}/2$.

During operation, one or more of the segments 420a-420c can be selected to provide a desired gain. Each of the segments 420a-420c can be selected by providing a respective one of the enable signals EN1, EN2, or EN3 to the LO buffer in the selected segment. When the LO buffer 435 receives the enable signal, the LO signals LOn, LOp are passed to the passive mixer 430, and the mixer switches 431a, 431b are switched on in response to the LO signals LOn, LOp, thereby passing an input signal through the resistor 411 and the mixer 430. Thus, the resistance of the resistor 411 can be reflected into the front end gain.

If no enable signal is provided to the LO buffer 435 of a segment 420a-420c, the segment is disabled. The LO signals LOn, LOp are pulled to $V_{SS}$ and the LO buffer 435 is powered down, thereby making the segment inactive. Thus, the resistor 411 in the segment 420a-420c is not reflected into the front end gain.

Input Matching Network with Variable Resistor

Figure 5A:
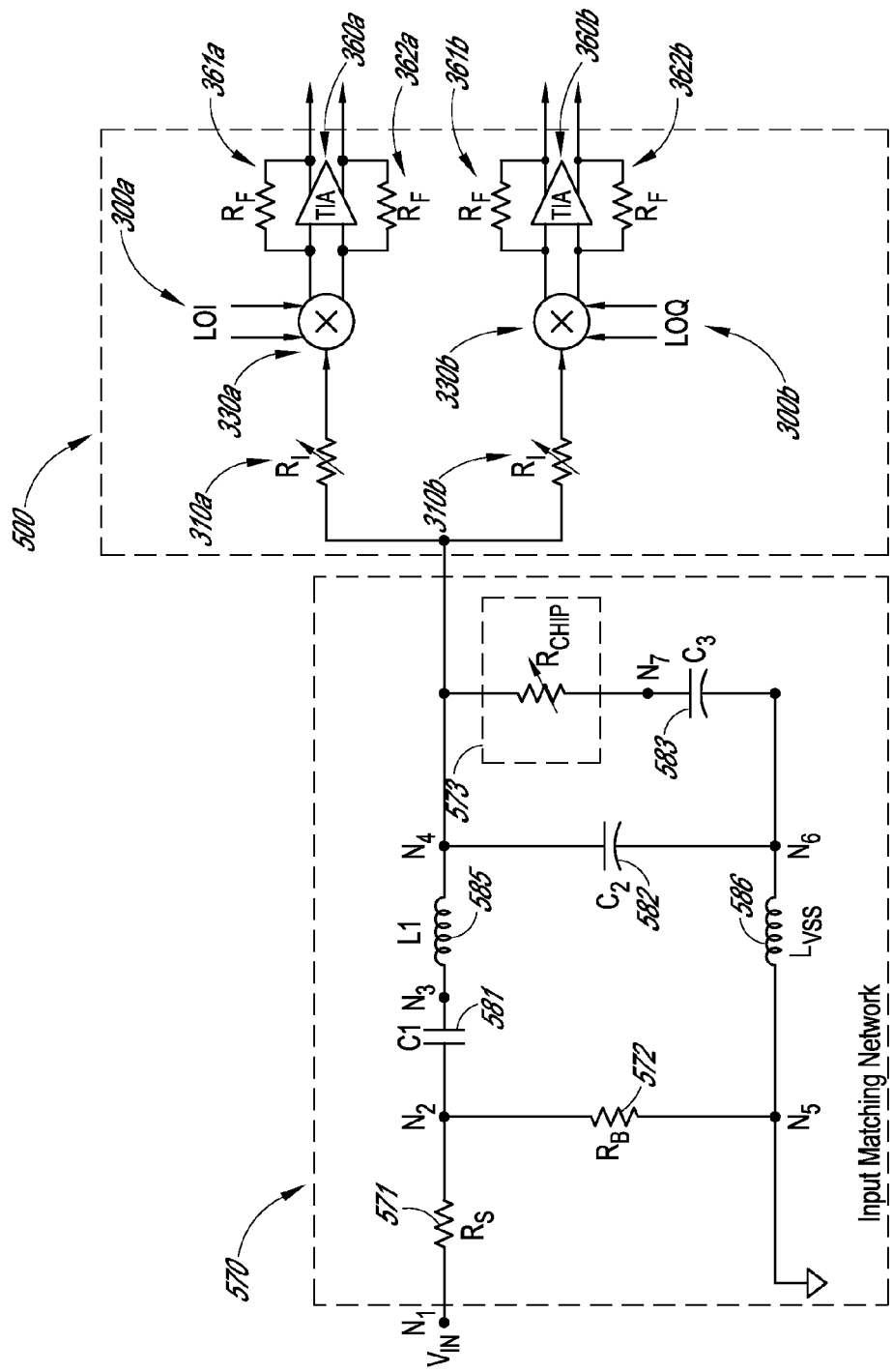
FIG. 5A is a schematic circuit diagram of an input matching network and a front end of an RF receiver according to one embodiment.
Figure 5B:
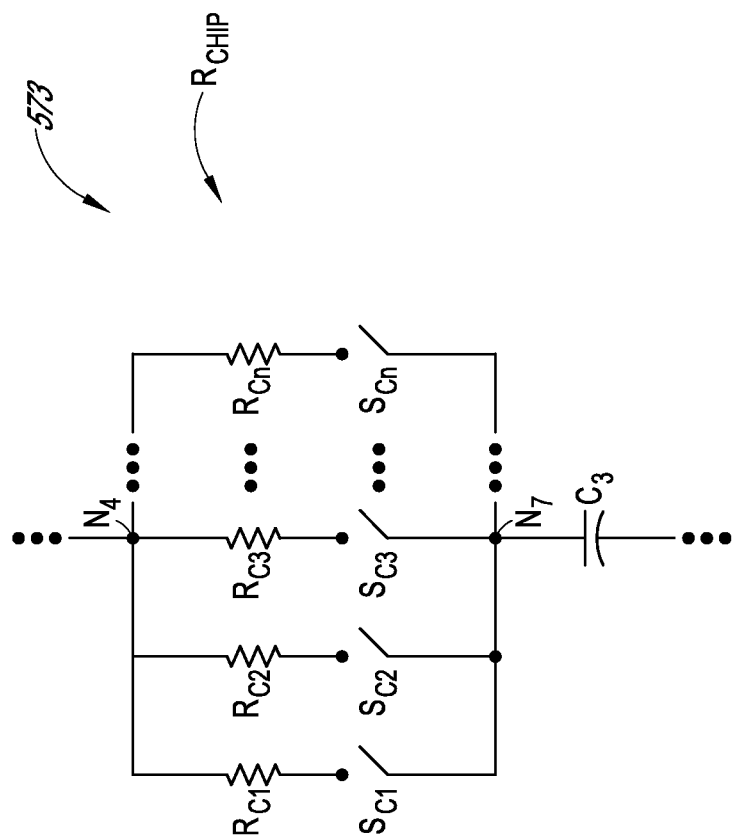
FIG. 5B is a schematic circuit diagram of a variable chip resistor of the input matching network of FIG. 5A according to one embodiment.

Referring to FIGS. 5A and 5B, an RF receiver system including a front end and an input matching network according to one embodiment will be described below. In the illustrated embodiment, the receiver system includes a front end 500 and an input matching network 570.

The front end 500 includes a first signal path 300a and a second signal path 300b. Each of the signal paths 300a, 300b can be as described above in connection with the front end 300, 400A, or 400B of FIGS. 3, 4A, and 4B, and can include a variable resistor 310a, 310b, a passive mixer 330a, 330b, a transimpedance amplifier 360a, 360b, and feedback resistors 361a, 361b, 362a, 362b. In one embodiment, the local oscillation signals LOI, LOQ can have a half duty cycle (about 50% duty cycle).

The input matching network 570 can include a first resistor 571, a second resistor 572, a third resistor 573, a first capacitor 581, a second capacitor 582, a third capacitor 583, a first inductor 585, a second inductor 586, and first to seventh nodes N1-N7. In the illustrated embodiment, the second resistor 572 is off-chip.

The first resistor 571 has a first end electrically coupled to the first node N1 to receive an input signal (for example, a voltage signal), and a second end electrically coupled to the second node N2. The first resistor 571 can have a resistance that matches with the resistance of a circuit viewed from the second node N2 toward the first capacitor 581. The first resistor 571 can also be referred to as a "source resistor." The first resistor 571 can have a resistance between about 25Ω and about 100Ω, for example, 50Ω.

The second resistor 572 has a first end electrically coupled to the second node N2, and a second end electrically coupled to the fifth node N5. The fifth node N5 can be electrically coupled to a voltage reference, such as ground. The second resistor 572 can also be referred to as a "board resistor," that is, off-chip. The second resistor 572 can have a resistance between about 25Ω and about 100Ω, for example, 50Ω.

The third resistor 573 has a first end electrically coupled to the fourth node N4, and a second end electrically coupled to the seventh node N7. The third resistor 573 can also be referred to as a "chip resistor" or "shunt resistor" in the context of this document. The third resistor 573 can be a variable or programmable resistor, which has a programmable resistance varying in a range between about 50Ω and about 100 kΩ skilled artisan will, however, appreciate that the resistance of the third resistor 573 can vary widely, depending on the design of the front end 300.

The third resistor 573 can be a copy of the variable resistor 411, and can be switched in when the resistance of the variable resistor 411 is reduced. The resistance of the third resistor 573 can be adjusted by a controller to keep the overall impedance of the front end and the input matching network 570 relatively constant, regardless of the gain set by the variable input resistors $R_f$. Details of the third resistor 573 will be described later in connection with FIG. 5B.

The first capacitor 581 has a first terminal electrically coupled to the second node N2, and a second terminal electrically coupled to the third node N3. The first capacitor 581 can serve as an AC-coupling capacitor, and can have a capacitance between about 100 pF and about 1000 pF. The second capacitor 582 has a first terminal electrically coupled to the fourth node N4, and a second terminal electrically coupled to the sixth node N6. The second capacitor 582 models parasitic capacitance in the front end 500, and is typically not variable. The third capacitor 583 has a first terminal electrically coupled to the seventh node N7, and a second terminal electrically coupled to the sixth node N6. The third capacitor 583 can serve as an AC-coupling capacitor, and can have a capacitance between about 1 pF and about 40 pF, for example 15 pF. In one embodiment, the third capacitor 583 can be implemented with MOS device capacitors (for example, 1.2 V NMOS device capacitors).

The first inductor 585 has a first terminal electrically coupled to the third node N3, and a second terminal electrically coupled to the fourth node N4. The first inductor 585 can model frequency-dependent impedance of, for example, bond wires. The second inductor 586 has a first terminal electrically coupled to the fifth node N5, and a second terminal electrically coupled to the sixth node N6. The second inductor 586 can model inductance by, for example, bond wires. In another embodiment, another resistor can be added between the second node N2 and the first capacitor 581 to dampen resonance caused by the inductors 585, 586 and the second capacitor 582.

Referring to FIG. 5B, the third resistor 573 can include a plurality of resistor-switch sets coupled in parallel to one another according to one embodiment. In the illustrated embodiment, the third resistor 573 includes first to n-th resistors $R_{c1}$-$R_{cn}$, and first to n-th switches $S_{c1}$-$S_{cn}$. The first to n-th switches $S_{c1}$-$S_{cn}$ are electrically coupled in series with the first to n-th resistors $R_{c1}$-$R_{cn}$, respectively. In one embodiment, n can be an integer between 2 and 20, for example, 6. A skilled artisan will, however, appreciate that n can vary widely, depending on the resolution of the input matching network 570.

The first to n-th resistors $R_{c1}$-$R_{cn}$ can have substantially the same resistance as one another. Each of the first to n-th resistors $R_{c1}$-$R_{cn}$ has a first end electrically coupled to the fourth node N4, and a second end electrically coupled to a respective one of the first to n-th switches $S_{c1}$-$S_{cn}$ which are electrically coupled to the seventh node N7. During operation, the resistance of the resistor 573 can be selected by switching on or off the first to n-th switches $S_{c1}$-$S_{cn}$ to provide a desired resistance.

By adjusting the resistance of the resistor 573, the input matching network can provide substantially the same resistance when viewed from the second node N2 toward to the first capacitor 581, regardless of the gain change in the front end 500 (which can be achieved by varying the resistance of the variable resistor 310a, 310b in the front end 500). For example, when the variable resistance 310 is adjusted to have a lower resistance for a gain change, the resistance of the resistor 573 can be increased such that the input impedance seen from the second node N2 is substantially constant. Thus, signal reflection from the front end 500 can be reduced, thereby enhancing power transfer to the front end 500.

Figure 5C:
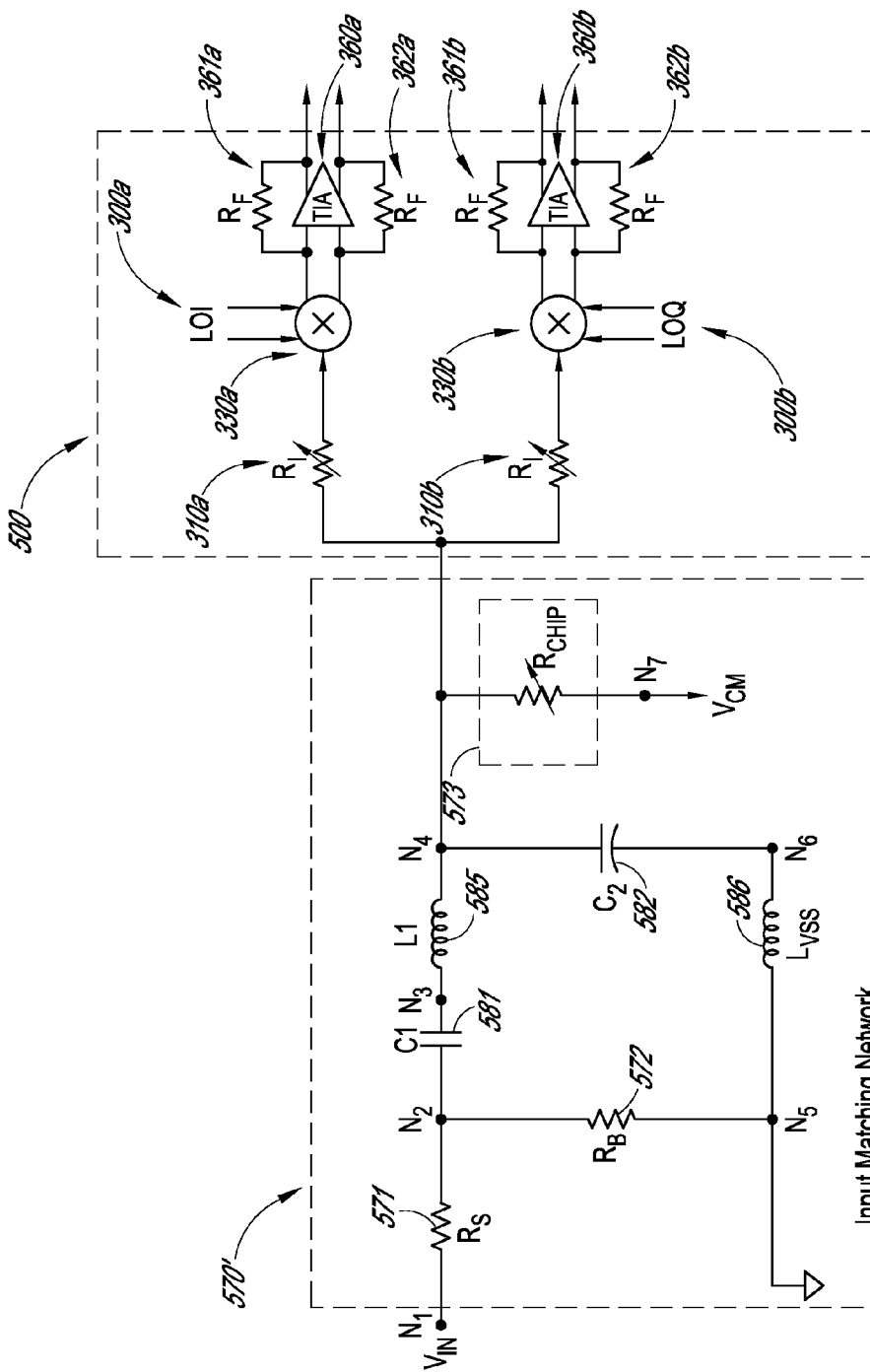
FIG. 5C is a schematic circuit diagram of an input matching network and a front end of an RF receiver according to another embodiment.

Referring to FIG. 5C, an RF receiver system including a front end and an input matching network according to another embodiment will be described below. In the illustrated embodiment, the receiver system includes a front end 500 and an input matching network 570'. The configurations of the front end 500 and the input matching network 570' can be the same as those of the front end 500 and the input matching network 570 of FIG. 5A except that the input matching network 570' does not include the third capacitor 583 in FIG. 5A. Instead, the seventh node N7 is electrically coupled to a voltage reference $V_{CM}$ having a common-mode voltage.

Figure 5D:
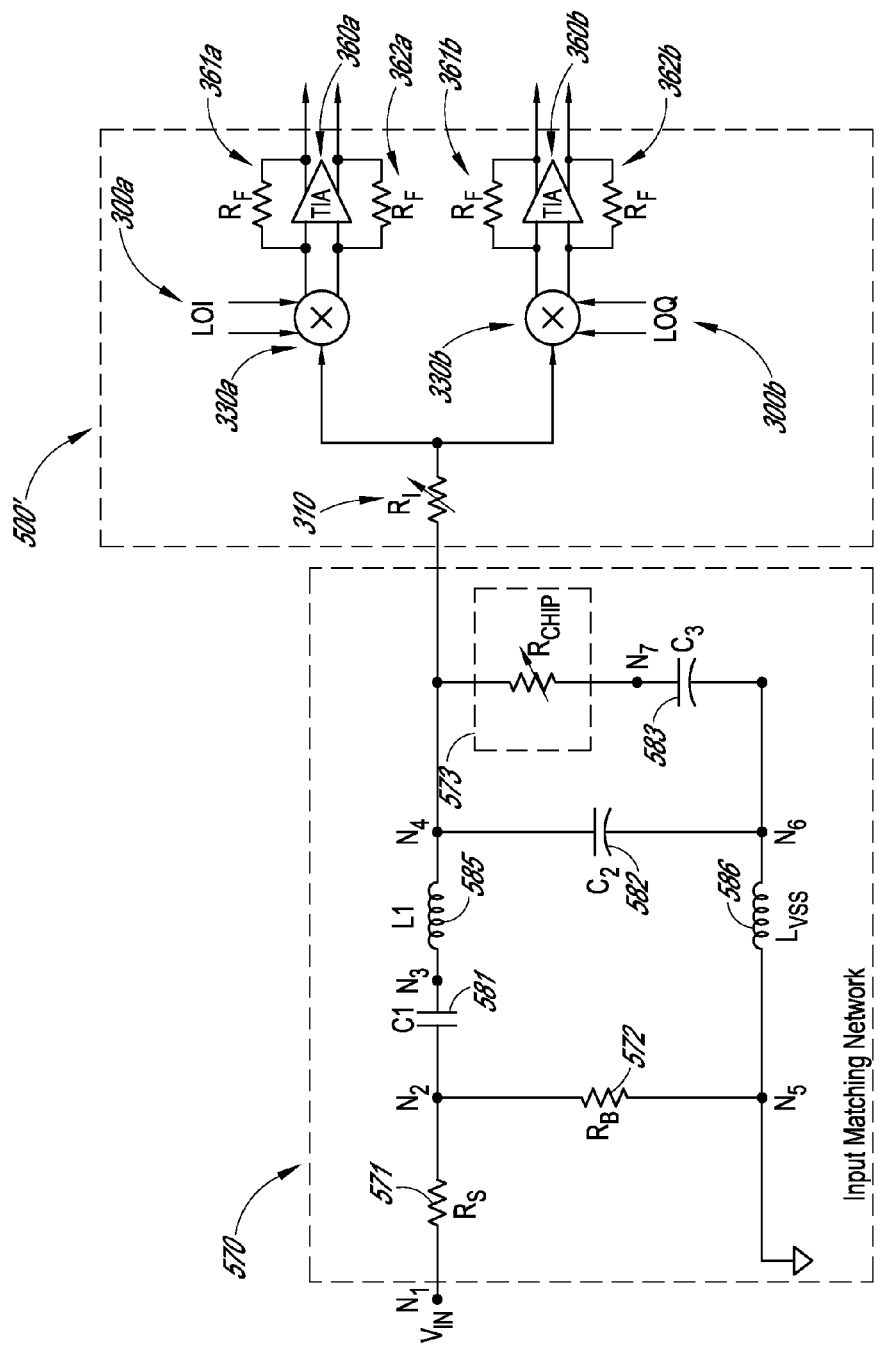
FIG. 5D is a schematic circuit diagram of an input matching network and a front end of an RF receiver according to yet another embodiment.

Referring to FIG. 5D, an RF receiver system including a front end and an input matching network according to yet another embodiment will be described below. In the illustrated embodiment, the receiver system includes a front end 500' and an input matching network 570. The configurations of the front end 500' and the input matching network 570 can be the same as those of the front end 500 and the input matching network 570 of FIG. 5A except that the input matching network 500' includes a single variable resistor 310, instead of two variable resistors 310a, 310b in FIG. 5A. The single variable resistor 310 has a first end electrically coupled to the fourth node N4, and a second end electrically coupled to both of the inputs of the passive mixers 330a, 330b that are part of I and Q paths, respectively. In such an embodiment, the local oscillation signals LOI, LOQ can have a quarter duty cycle (about 25% duty cycle). In yet another embodiment, an RF receiver system can include a combination of the front end 500' of FIG. 5D and the input matching network 570' of FIG. 5C.

Input Matching Network with No Variable or Programmable Resistor

Figure 6A:
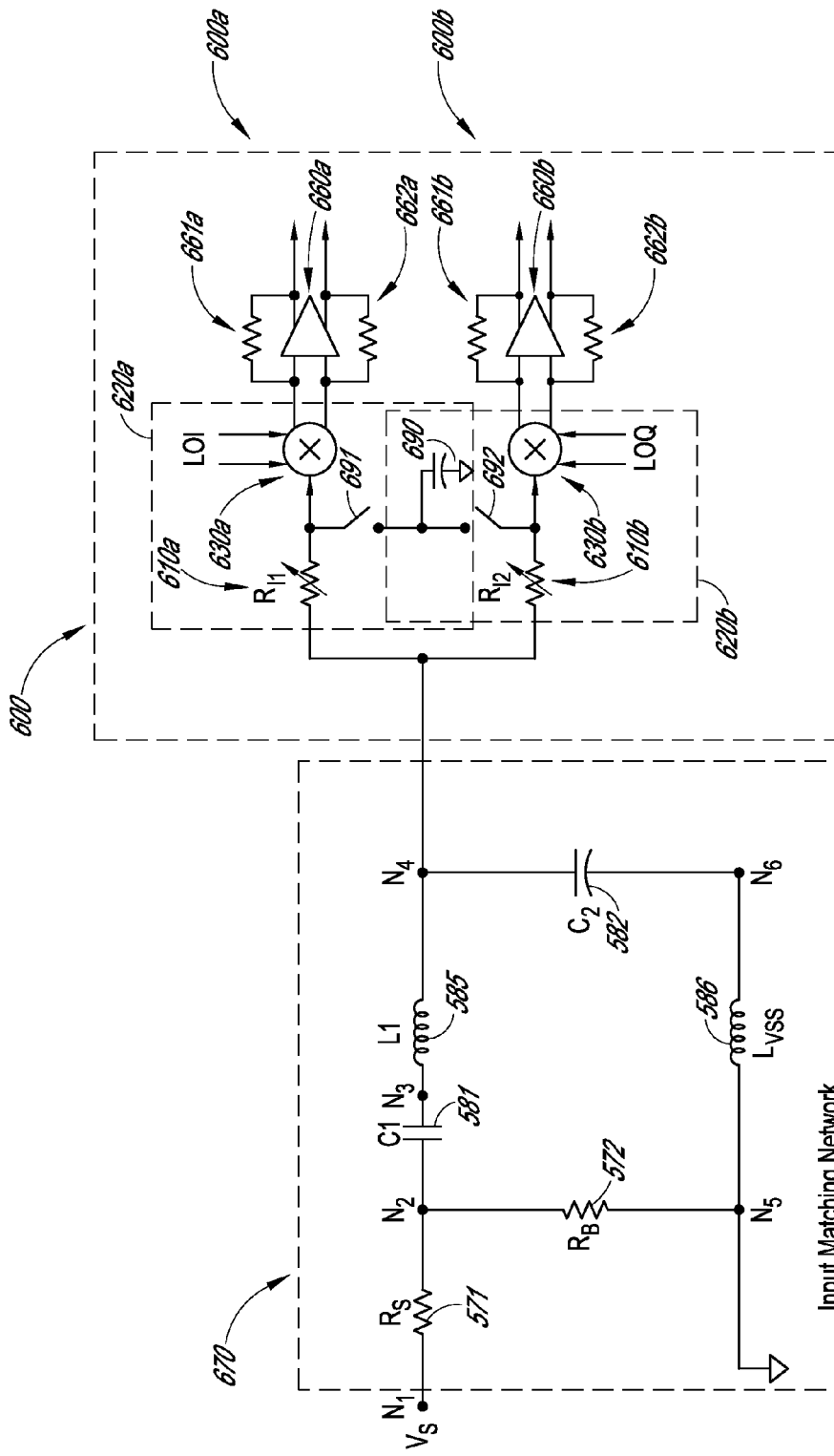
FIG. 6A is a schematic circuit diagram of an input matching network and a front end of an RF receiver according to another embodiment.

Referring to FIG. 6A, an RF receiver system including a front end and an input matching network according to another embodiment will be described below. In the illustrated embodiment, the receiver system includes a front end 600 and an input matching network 670.

The front end 600 includes a first signal path 600a and a second signal path 600b. Each of the signal paths 600a, 600b can include a variable resistor 610a, 610b, a passive mixer 630a, 630b, a transimpedance amplifier 660a, 660b, and feedback resistors 661a, 662a, 661b, 662b.

The front end 600 can also include a front end capacitor 690, a first capacitor switch 691, and a second capacitor switch 692. The front end capacitor 690 has a first terminal electrically coupled to the first and second capacitor switches 691, 692, and a second terminal electrically coupled to a voltage reference, for example, ground. Each of the first or second capacitor switch 691, 692 is electrically coupled between the front end capacitor 690 and a node within a respective one of the signal paths 600a, 600b. The node can be between the variable resistor 610a, 610b and the passive mixer 630a, 630b. Other details of the foregoing components of the front end 600 can be as described above in connection with those of FIG. 5A.

The input matching network 670 can include a first resistor 571, a second resistor 572, a first capacitor 581, a second capacitor 582, a first inductor 585, a second inductor 586, and first to sixth nodes N1-N6. Details of the foregoing components of the input matching network 670 can be the same as those of the input matching network 570 described above in connection with FIG. 5A except that the input matching network 670 does not include the third resistor 573 and the third capacitor 583 in the input matching network 570.

Figure 6B:
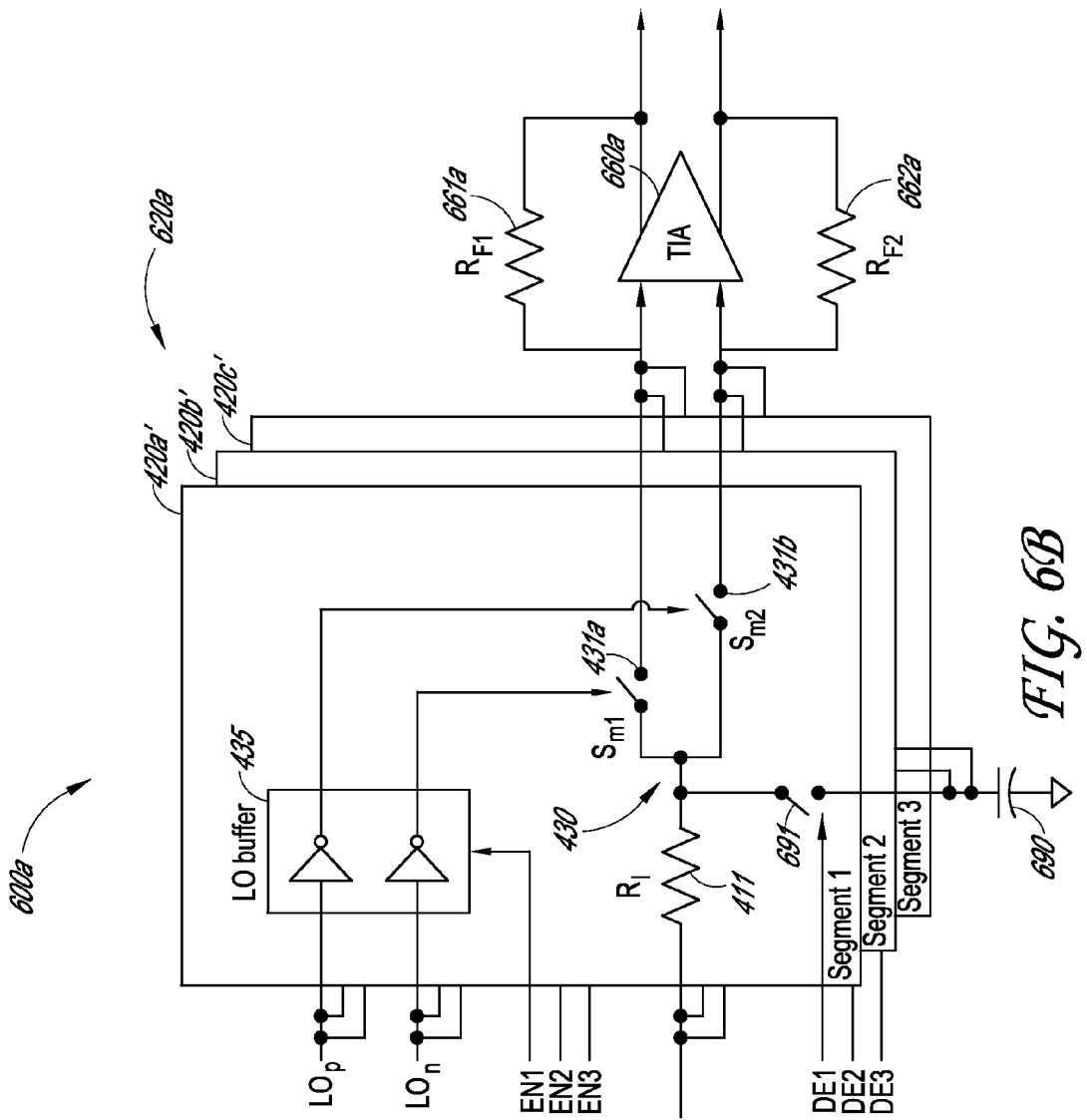
FIG. 6B is a schematic circuit diagram of the front end of FIG. 6A according to yet another embodiment.

Referring to FIG. 6B, the front end according to one embodiment will be described in more detail. The illustrated front end 600a can form the first signal path 600a of FIG. 6A. The second signal path 600b of FIG. 6A can have the same configuration as the first signal path 600a shown in FIG. 6B.

The illustrated front end 600a includes first to third resistor/mixer segments 420a'-420c', a transimpedance amplifier 660a, and first and second feedback resistors 661a, 662a. Details of the segments 420a'-420c', the transimpedance amplifier 660a, and the first and second feedback resistors 661a, 662a can be as described above in connection with FIG. 4B except that each of the segments 420a'-420c' further includes a capacitor switch 691 electrically coupled to a node between the resistor 411 and the passive mixer 430, and to the front end capacitor 690. The segments 420a'-420c' can collectively form a resistor/mixer block 620a, 620b, as denoted in FIG. 6A.

Each of the segments 420a'-420c' can receive a respective one of disable signals DE1-DE3 to control the switching of the capacitor switch 691 in the segment 420a'-420c'. Upon receiving the disable signal DE1-DE3, the capacitor switch 691 is switched on, thereby electrically connecting the resistor 411 to AC ground through the front end capacitor 690.

By being connected to AC ground, the resistor 411 is switched out such that the resistor 411 does not contribute to the gain of the front end 600. However, the input impedance, which is an impedance viewed from the second node N2 toward to the first capacitor 581, can be substantially the same because the resistor 411 is seen from the second node N2 as if it is still coupled to the transimpedance amplifier 660a or the passive mixer 630a, 630b (of which the inputs are at virtual ground). Thus, even when the gain setting is changed in the front end 600 by changing the resistance of the variable input resistor 610a, 610b, the input impedance can be kept substantially constant.

Figure 6C:
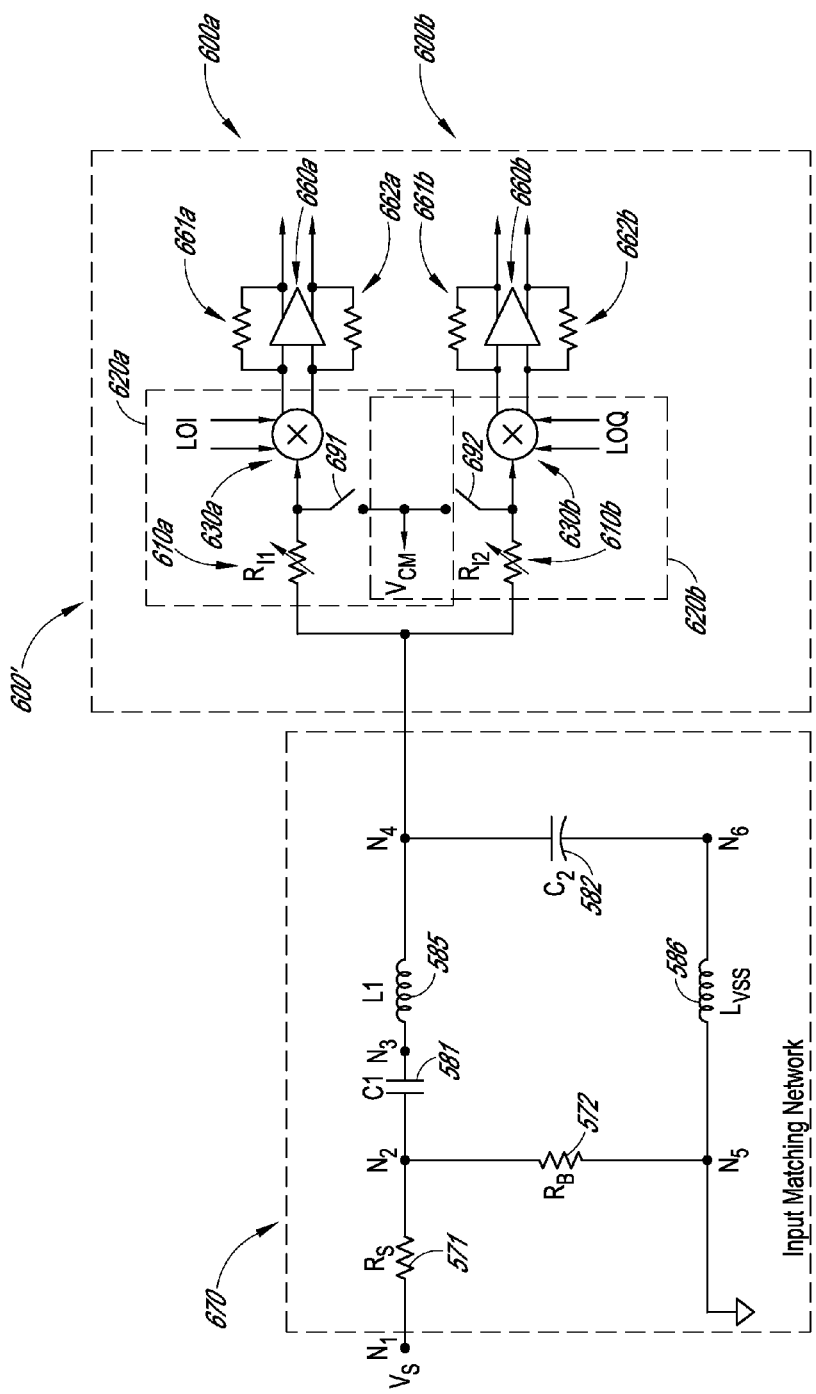
FIG. 6C is a schematic circuit diagram of an input matching network and a front end of an RF receiver according to yet another embodiment.

Referring to FIG. 6C, an RF receiver system including a front end and an input matching network according to yet another embodiment will be described below. In the illustrated embodiment, the receiver system includes a front end 600' and an input matching network 670. The configurations of the front end 600' and the input matching network 670 can be the same as those of the front end 600 and the input matching network 670 of FIG. 6A except that the front end 600' does not include the front end capacitor 690 in FIG. 6A. Instead, the switches 691, 692 are electrically coupled to a voltage reference $V_{CM}$ having a common-mode voltage. In another embodiment, the front end 600a in FIG. 6B can be modified such that the switches 691 are electrically coupled to a voltage reference $V_{CM}$ having a common-mode voltage, in place of the capacitor 690.

Simulated Examples

Figure 7A:
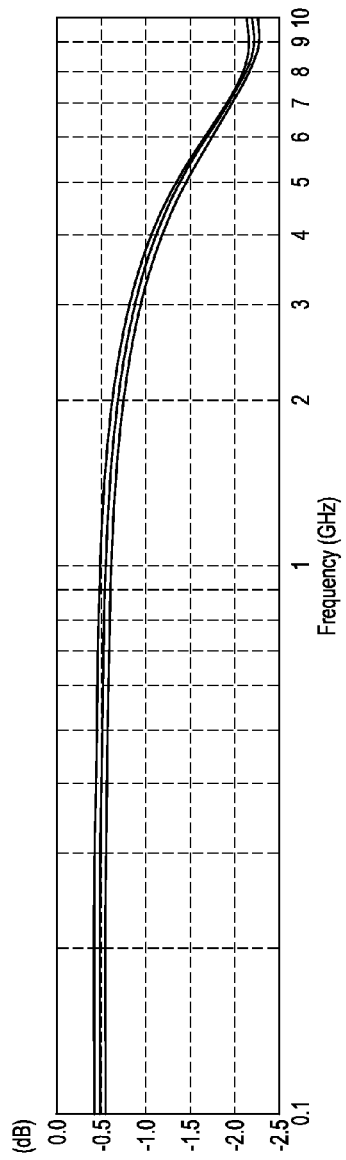
FIG. 7A is a graph illustrating relationship between input signals to the board and frequency characteristics of an RF receiver according to simulated examples.
Figure 7B:
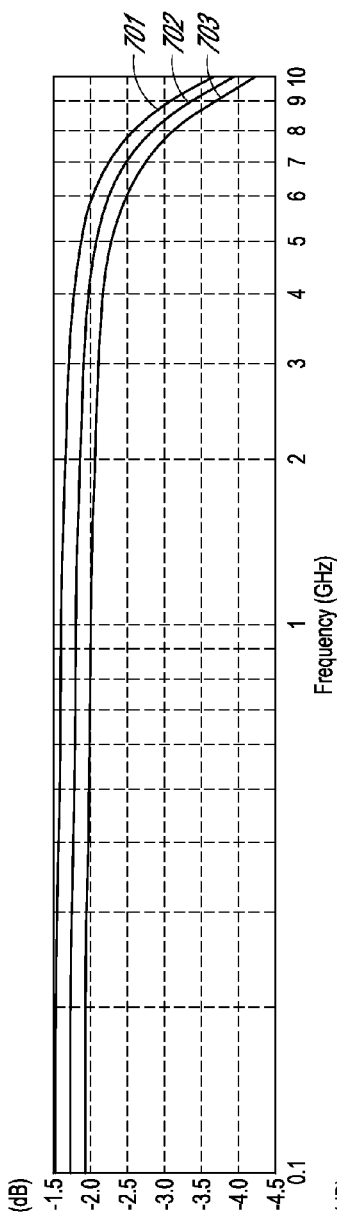
FIG. 7B is a graph illustrating relationship between chip side input signals after input matching and frequency characteristics of an RF receiver according to the simulated examples.
Figure 7C:
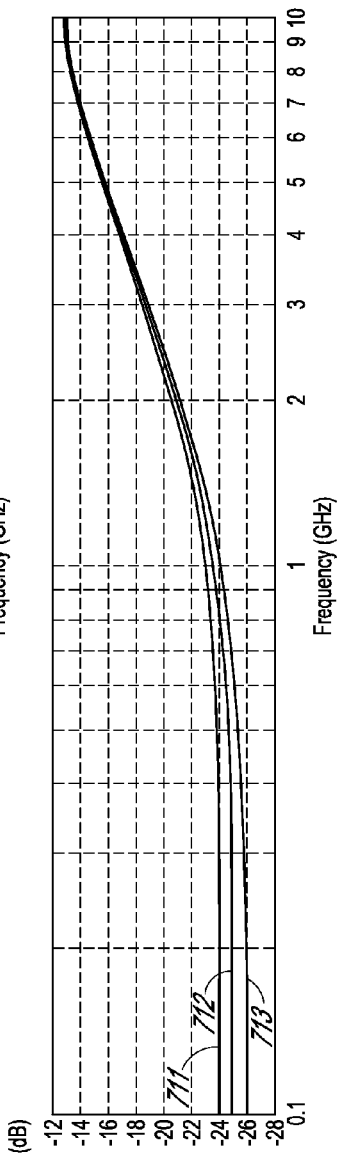
FIG. 7C is a graph illustrating relationship between impedance matching and frequency characteristics of RF receivers according to the simulated examples.

Referring to FIGS. 7A-7C, first simulated examples of receiver systems according to one embodiment will be described below. In the first examples, RF receiver systems including the front end 400A or 500 and the input matching network 570 of FIGS. 4A, 5A and 5B were tested by simulation. In the first examples, the speeds of the switches (MOSFETs) in the passive mixer 330, the resistances of the resistors, and capacitances of the capacitors in the front end 500 and the input matching network 570 were varied by simulation. The following sets of values in Table 1 were given to the components in the front end 500 and the input matching network 570.

TABLE 1

| Set | A | B1 | B2 | B3 | B4 | C1 | C2 | C3 | C4 |
|---|---|---|---|---|---|---|---|---|---|
| NMOS | Nom | Fast | Fast | Fast | Fast | Slow | Slow | Slow | Slow |
| Resistor | Nom | Min | Min | Max | Max | Min | Min | Max | Max |
| Capacitor | Nom | Min | Max | Min | Max | Min | Max | Min | Max |

In Table 1, NMOS represents, for example, the first mixer switch 431a and the second mixer switch 431b of FIG. 4A. The resistor represents the input resistor 310a, 310b of FIG. 5A, and the capacitor represents the capacitor 583 of FIG. 5A.

"Slow" represents a speed of about 30% slower than the nominal speed ("Nom"). "Fast" represents a speed of about 30% faster than the nominal speed. "Min" represents a value of about 30% lower than the nominal value ("Nom"). "Max" represents a value of about 30% higher than the nominal value.

Input signals were applied to a board including the front end 500 and the input matching network 570 (FIG. 5A), as shown in FIG. 7A. Signal characteristics at the fourth node N4 (FIG. 5A) (after impedance is matched) are shown in FIG. 7B. In FIG. 7B, the Set A resulted in a line 702. The Sets B1-B4 resulted in lines 701, and the Sets C1-C4 resulted in lines 703. Signal characteristics at the fourth node N4 (FIG. 5A) are shown in FIG. 7B. Signal reflections by the receiver systems are shown in FIG. 7C. In FIG. 7C, the Set A resulted in a line 712. The Sets B1-B4 resulted in lines 711, and the Sets C1-C4 resulted in lines 713.

FIG. 7B shows that the signals are substantially constant between about 100 MHz and about 6 GHz. This can indicate that the system is substantially frequency independent within the frequency range, regardless of the sizes of the switches, the resistances of the resistors, and capacitances of the capacitors in the input matching network. Further, FIG. 7C shows that the systems have a relatively low reflection within a range between about 100 MHz and about 6 GHz.

In the embodiment described in connection with FIGS. 5A and 5B, when implemented off-chip, since the off-chip resistor 572 is the only gain component that does not track temperature or chip process, the input impedance of the receiver need only be relatively large compared to the resistance of the off-chip resistor 572 to have reduced temperature or process dependence. This variation, shown in FIGS. 7A-7C, is advantageously only a few tenths of a decibel (dB) if the input impedance is large, compared to several dB of variation with typical RF receivers.

Figure 8A:
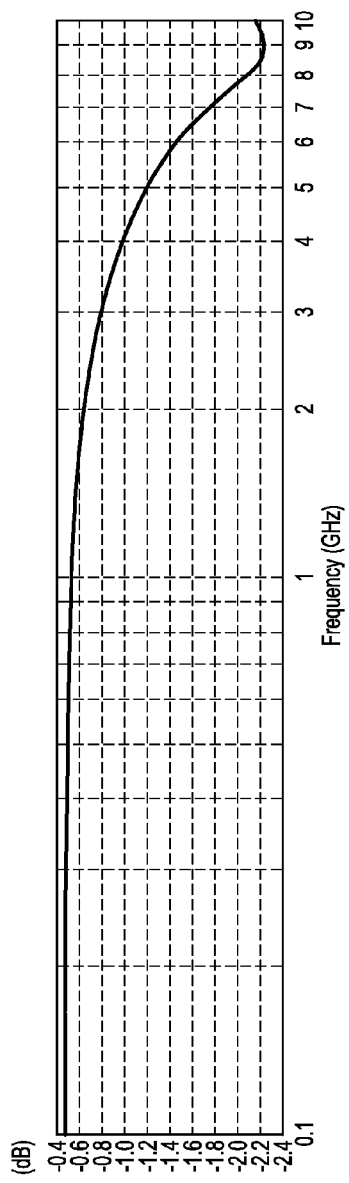
FIGS. 8A to 8C are graphs illustrating relationships between gain settings and frequency characteristics of RF receivers according to other examples.
Figure 8B:
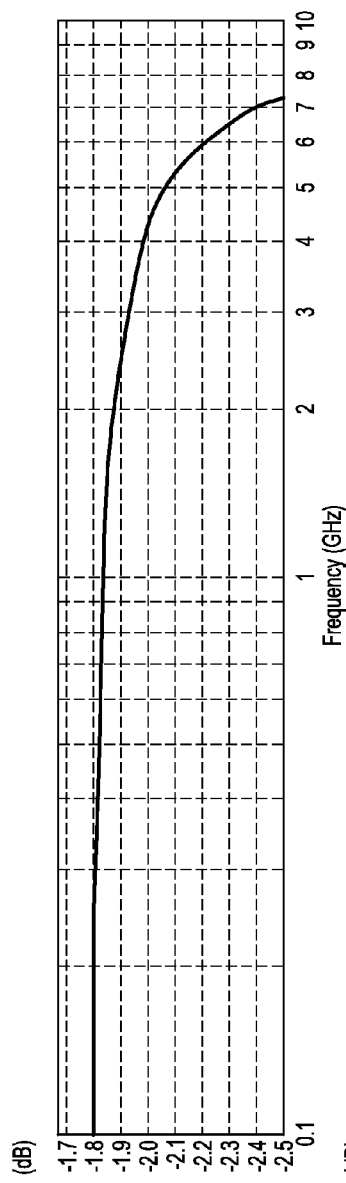
Figure 8C:
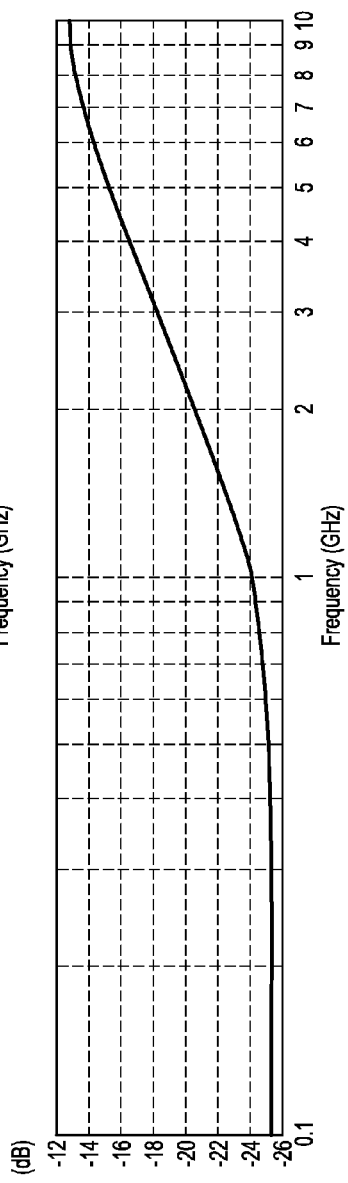

Referring to FIGS. 8A-8C, second simulated examples of receiver systems according to one embodiment will be described below. In the second examples, RF receiver systems including the front end 500 and the input matching network 570 of FIGS. 5A and 5B were simulated. In the second examples, the gain setting in the front end 500 were varied by simulation to be 0 dB, 6 dB, and 9 dB.

Input signals were applied to a board including the front end 500 and the input matching network 570 (FIG. 5A). Signal characteristics at the first node N2 (FIG. 5A) (after impedance is matched) are shown in FIG. 8A. Signal characteristics at the fourth node N4 (FIG. 5A) are shown in FIG. 8B. Signal reflections by the receiver systems are shown in FIG. 8C.

FIG. 8B shows that the signal characteristics in different gain setting are substantially the same as one another (as small as about 0.01 dB between the different gain settings). This can indicate that the system has relatively constant input impedance and is substantially frequency-independent within the frequency range, regardless of the gain setting of the front end. Further, FIG. 8C shows that the systems have a relatively low reflection within a range between about 100 MHz and about 6 GHz.

As set forth above, the receiver systems according to the above embodiments can have an operating range, for example, between about 0.1 GHz and about 6 GHz, or optionally between about 0.5 GHz and about 6 GHz, using, for example, a 1.3 V power supply voltage. Its gain is relatively temperature- and frequency-insensitive with a variation due to temperature less than about 0.55 dB, and a variation due to frequency less than 1 dB across the frequency range. The temperature range can be, for example, between about −40° C. and about 110° C. The frequency range can be between DC and about 6 GHz. A skilled artisan will, however, appreciate that the configurations of the receiver systems can be adapted for other temperature and/or frequency ranges.

As described above, the gain of the front end is a ratio of (polysilicon) resistors whose values vary together over temperature, and the linearity is dominated by the baseband which is much higher than typical RF front ends. The bandwidth of the receiver can also be large since the dominating capacitor is the input capacitance of, for example, about 200 fF due to the pad and electrostatic discharge (ESD) protection diodes (which would typically be present on any RF input), making the gain frequency insensitive. In one embodiment, the minimum frequency for the bandwidth is limited only by the value of an off-chip AC-coupling capacitor and the applicable downconverter mixer local oscillator frequency.

Further, the receivers systems can be easily implemented with deep sub-micron technologies. In addition, the front ends of the receiver systems can have a size which is as small as about 5% of the size of the front end of the conventional system of FIG. 1 as they have a simpler design.

Transmission Power Detector

Certain transceivers can include a transmit power detector for monitoring transmit power. An example of such a transceiver is disclosed in U.S. Pat. No. 7,418,244 to Antonio J. Montalvo, the disclosure of which is incorporated herein by reference in its entirety.

Figure 9:
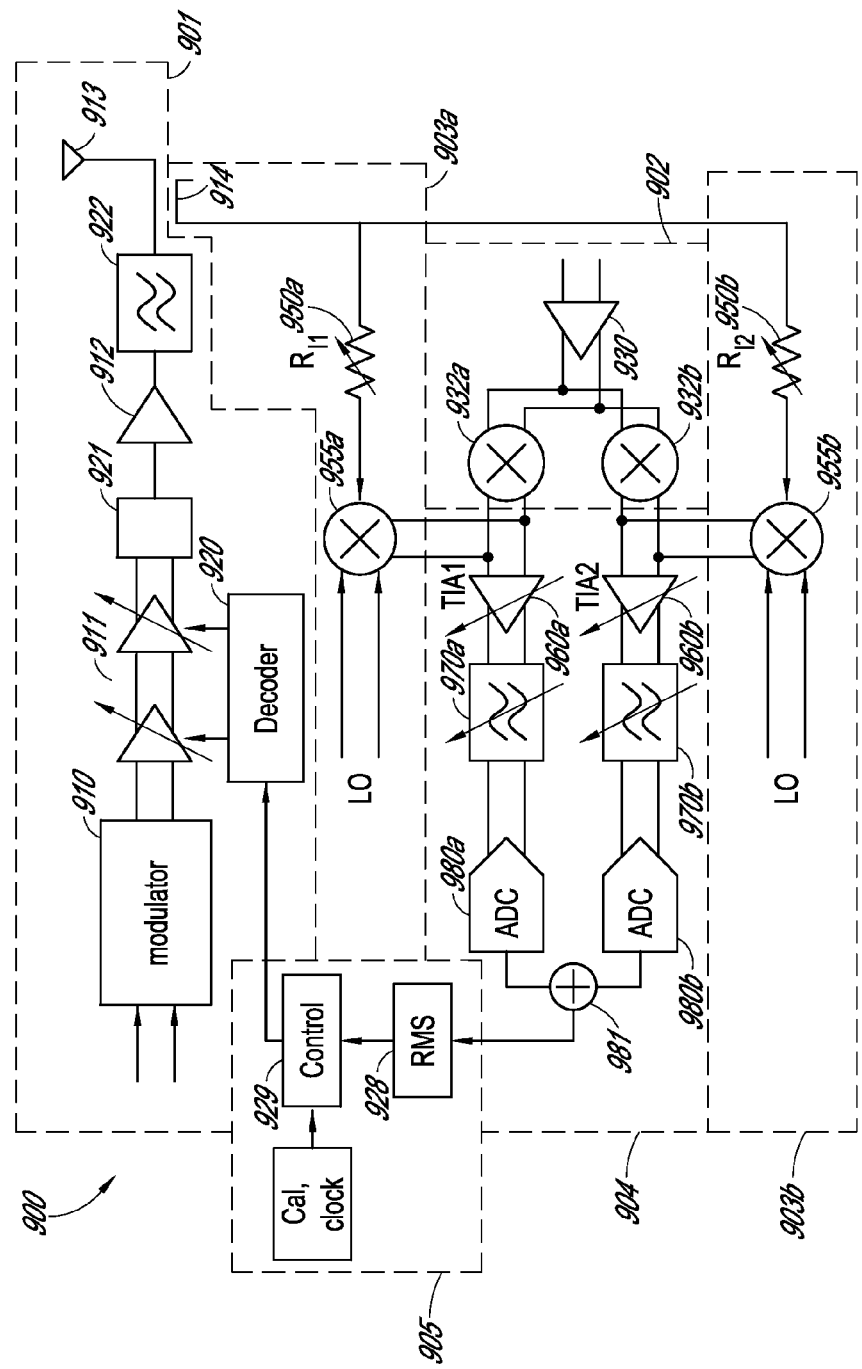
FIG. 9 is a schematic block diagram of an RF transmitter with power detection circuit including a front end according to one embodiment.

Referring to FIG. 9, one embodiment of a transceiver that can include a transmit power detector for monitoring transmit power will be described below. In the illustrated embodiment, the transceiver 900 includes a transmit path 901, a main receiver down converter 902, a transmit detector down converter 903a, 903b, a receiver baseband path 904, and a control block 905. In some systems (TDD systems, for example), at most, either the receiver or transmitter is active at any time, that is, both the receiver and transmitter are not active at the same time. In these systems, the receiver baseband path 904 can be shared by the main receive path and the transmit detector path.

The transmit path 901 can include a baseband modulator 910, a two-stage variable gain amplifier (VGA) 911, a bandpass filter 921, a power amplifier (PA) 912, a decoder 920, an output filter 922, and an antenna 913. The baseband modulator 910 generates a modulated RF signal and provides the modulated RF signal to the VGA 911. The VGA 911 serves to amplify the modulated RF signal in response to input from the decoder 920. The output of the VGA 911 is provided to the bandpass filter 921, which serves to filter out a desired frequency range. The power amplifier 912 serves to amplify an input provided by the bandpass filter 921. The output filter 922 serves to filter an output of the power amplifier 912 and provide an RF signal to an input of the antenna 913.

In the illustrated embodiment, a transmit power detection circuit can be used to detect power of transmit signals from the transmit path 901. The transmit detector receiver can use the down converter 903a, 903b and the receiver baseband path 904. In other words, the detection circuit can include a directional coupler 914, variable resistors 950a, 950b, passive mixers 955a, 955b, transimpedance amplifiers 960a, 960b, programmable filters 970a, 970b, analog to digital converters (ADC) 980a, 980b, and an adder 981.

The directional coupler 914 serves to RF sample a portion of the RF signal provided to the antenna 913. An output of the directional coupler 914 drives a transmit detect downconverter stage (which includes the variable resistors 950a, 950b and the passive mixers 955a, 955b), and the transimpedance amplifiers 960a, 960b. In the illustrated embodiment, the components 950a, 955a, 960a, 970a, and 980a can form an I path. The components 950b, 955b, 960b, 970b, and 980b can form a Q path that can have the same functionality as the I path.

The control block 905 can include a root mean squared (RMS) circuit 928 and a control module 929. The RMS circuit 927 serves to generate the root mean square output from an output of the adder 981. The root mean square output is provided to the control module that serves to control the decoder 920, which in turn generates a control signal for the VGA 911. This configuration can serve to reduce or minimize a difference between the digital power detect signal from the ADC 927 and a reference signal input to the control module 929.

There is a linear relationship between the output of the ADCs 980a, 980b and the transmitted power. The intercept of that relationship can advantageously be calibrated with a single measurement during manufacturing. Since the calibration need be done only once and at only one frequency, the primary requirements for the detector path are frequency and temperature independent gain.

In the illustrated embodiment, the variable resistors 950a, 950b, the passive mixers 955a, 955b and the transimpedance amplifiers 960a, 960b can have the same configurations as described above in connection with one or more of FIG. 3, 4A, 4B, 6A, or 6B. By having such configurations, the transmit power detection circuit can have a gain that is temperature- and frequency-independent, as described in the above embodiments. In other embodiments, the transmit power detection circuit can also include an input matching network as described above in connection with FIGS. 5A-6B. As such, the transmit power detection circuit can make accurate measurement of power without recalibration during operation.

Applications

In certain applications, the receiver system of the embodiments described above can be used in applications in which the acceptable noise figure is as high as, for example around 10 dB. The receiver system can also be used for various other applications, including, but not limited to: a stand-alone power detector, a transmit observation receiver for digital predistortion (DPD), and high linearity receiver for infrastructure applications (for example, wireless base stations). The receiver system of the embodiments can be particularly useful for stand-alone power detectors because of its frequency selectivity and tunability.

Thus, a skilled artisan will appreciate that the configurations and principles of the embodiments can be adapted for any other transceivers or receivers. The circuits employing the above described configurations can be implemented into various electronic devices or integrated circuits. Examples of the electronic devices can include, but are not limited to, consumer electronic products, parts of the consumer electronic products, electronic test equipments, etc. Examples of the electronic devices can also include circuits of optical networks or other communication networks, and disk driver circuits. The consumer electronic products can include, but are not limited to, a mobile phone, cellular base stations, a telephone, a television, a computer monitor, a computer, a hand-held computer, a netbook, a tablet computer, a digital book, a personal digital assistant (PDA), a stereo system, a cassette recorder or player, a DVD player, a CD player, a VCR, a DVR, an MP3 player, a radio, a camcorder, a camera, a digital camera, a portable memory chip, a copier, a facsimile machine, a scanner, a multi functional peripheral device, a wrist watch, a clock, etc. Further, the electronic device can include unfinished products.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

What is claimed is:

1. An apparatus comprising:
a front end having an input and an output, the front end forming at least part of a radio frequency (RF) signal receive path, the front end comprising:
a front-end resistor of the receive path, the front-end resistor configured to receive an input signal from the input of the front end;
a passive mixer located downstream of the front-end resistor in the receive path, the passive mixer being configured to mix the input signal from the front-end resistor with a local oscillation signal, wherein the passive mixer is not coupled to a voltage reference for biasing;
a transimpedance amplifier located downstream of the passive mixer on the receive path; and
a feedback resistor coupled between an input and an output of the transimpedance amplifier.

2. The apparatus of claim 1, wherein the front-end resistor and the feedback resistor have the same composition.

3. The apparatus of claim 1, wherein each of the front-end resistor and the feedback resistor comprises a polysilicon resistor.

4. The apparatus of claim 1, wherein the front end has a gain at least partially proportional to a ratio of the resistance of the feedback resistor to the resistance of the front-end resistor, and wherein the gain is substantially temperature insensitive.

5. The apparatus of claim 1, wherein the front-end resistor comprises a variable or programmable resistor.

6. The apparatus of claim 1, wherein the front-end resistor comprises a plurality of unit resistors that are selectively electrically coupled between the input of the front end and the passive mixer to provide a selected gain for the front end.

7. The apparatus of claim 6, wherein the front end further comprises a plurality of input switches, each of the input switches being electrically coupled between a respective one of the unit resistors and the passive mixer for selection of gain.

8. The apparatus of claim 7, wherein the transimpedance amplifier further comprises another input;
wherein the passive mixer comprises a first mixer switch and a second mixer switch;

wherein the first mixer switch is electrically coupled between the plurality of input switches and the input of the transimpedance amplifier, the first mixer switch being configured to receive the local oscillation signal; and wherein the second mixer switch is electrically coupled between the plurality of input switches and the other input of the transimpedance amplifier, the second mixer switch being configured to receive a second local oscillation signal.

9. The apparatus of claim 1, wherein the front end further comprises a local oscillator buffer configured to buffer the local oscillation signal to generate a modified local oscillation signal, and wherein the passive mixer is configured to mix the input signal with the buffered local oscillation signal from the local oscillator buffer.

10. The apparatus of claim 1, wherein the front end comprises a plurality of resistor/mixer segments, wherein each of the segments comprises:
   a resistor electrically coupled to the input of the front end to receive the input signal;
   a local oscillator buffer configured to buffer the local oscillation signal to generate a buffered local oscillation signal; and
   a passive mixer located downstream of the resistor in the segment, the passive mixer being configured to mix the input signal with the buffered local oscillation signal from the local oscillator buffer in the segment to provide a mixed signal to the transimpedance amplifier;
   wherein one or more the segments are enabled to provide a selected gain for the front end.

11. The apparatus of claim 10, wherein the local oscillator buffer in at least one of the segments is configured to be turned on when the at least one segment is enabled.

12. The apparatus of claim 10, wherein the front end further comprises a front-end capacitor having a first terminal and a second terminal, the second terminal being electrically coupled to a voltage reference, and wherein each of the segments further comprises a switch having a first terminal electrically coupled to an input of the passive mixer in the segment, and a second terminal electrically coupled to the first terminal of the front-end capacitor.

13. The apparatus of claim 12, wherein the switch in at least one of the segments is configured to be turned on when the at least one segment is disabled.

14. The apparatus of claim 1, further comprising an input matching network having an input node and an output node, the input matching network being located upstream of the front end, the input matching network comprising a variable resistor electrically coupled to the output of the input matching network, wherein the variable resistor has a resistance configured to be adjusted when the resistance of the front-end resistor is changed, such that input impedance viewed from the input node of the input matching network toward the front end is substantially constant.

15. The apparatus of claim 14, wherein the variable resistor comprises a plurality of unit resistors and a plurality of switches, each of the unit resistors having a first end electrically coupled to the output node of the input matching network, and a second end electrically coupled to a respective one of the switches, wherein the switches are electrically coupled to a node in the input matching network.

16. The apparatus of claim 14, wherein the variable resistor is electrically coupled between the output of the input matching network and a voltage reference providing a common-mode voltage.

17. The apparatus of claim 16, wherein the front-end resistor comprises a variable or programmable resistor.

18. The apparatus of claim 14, wherein the input matching network further comprises:
   a first resistor having a first end electrically coupled to the input node of the input matching network, and a second end;
   a second resistor having a first end electrically coupled to the second end of the first resistor, and a second end electrically coupled to a voltage reference;
   a first capacitor having a first terminal electrically coupled to the second end of the first resistor, and a second terminal;
   a first inductor having a first terminal electrically coupled to the second terminal of the first capacitor, and a second terminal;
   a second capacitor having a first terminal electrically coupled to the second terminal of the first inductor, and a second terminal;
   a second inductor having a first terminal electrically coupled to the second terminal of the second capacitor, and a second terminal electrically coupled to the second end of the second resistor; and
   a third capacitor having a first terminal electrically coupled between the variable resistor and the second terminal of the second capacitor.

19. The apparatus of claim 18, wherein the front-end resistor comprises a variable or programmable resistor.

20. The apparatus of claim 14, wherein the front end is included in a semiconductor chip, and wherein the input matching network is separate from the chip.

21. The apparatus of claim 1, further comprising:
   a switch having a first terminal electrically coupled to an input of the passive mixer, and a second terminal; and
   a front-end capacitor having a first terminal electrically coupled to the second terminal of the switch, and a second terminal electrically coupled to a voltage reference.

22. The apparatus of claim 1, further comprising a switch having a first terminal electrically coupled to an input of the passive mixer, and a second terminal electrically coupled to a voltage reference providing a common-mode voltage.

23. The apparatus of claim 1, further comprising:
   an input matching network located upstream of the front end on the receive path;
   a programmable filter located downstream of the front end on the receive path; and
   an analog-to-digital converter located downstream of the programmable filter on the receive path.

24. The apparatus of claim 1, further comprising an RF transmitter; and a transmit power detector comprising the front end, wherein the front end is configured to receive a signal indicative of power from a portion of the transmitter.

25. An apparatus comprising:
   a front end for processing a radio frequency (RF) signal, the front end comprising:
      a first front-end resistor configured to convert a voltage signal to generate a first current signal;
      a first mixer configured to pass the first current signal at least partly in response to one or more first local oscillation signals, wherein the first mixer is not coupled to a voltage reference for biasing;
      a first transimpedance amplifier configured to amplify the current signal from the first mixer to generate an amplified voltage signal; and a first feedback resistor configured to feed the amplified voltage signal back to an input of the transimpedance amplifier.

26. The apparatus of claim 25, wherein the front end further comprises:
a second front-end resistor configured to convert the voltage signal to generate a second current signal;
a second mixer configured to pass the second current signal at least partly in response to one or more second local oscillation signals, wherein the second mixer is not coupled to a voltage reference for biasing;
a second transimpedance amplifier configured to amplify the second current signal from the second mixer to generate a second amplified voltage signal; and
a second feedback resistor configured to feed the second amplified voltage signal back to an input of the second transimpedance amplifier.

27. The apparatus of claim 26, wherein the first and second local oscillation signals have a duty cycle of about 50%.

28. The apparatus of claim 25, wherein the front end further comprises:
a second mixer configured to pass the first current signal in response to one or more second local oscillation signals, wherein the second mixer is not coupled to a voltage reference for biasing;
a second transimpedance amplifier configured to amplify the first current signal from the second mixer to generate a second amplified voltage signal; and
a second feedback resistor configured to feed the second amplified voltage signal back to an input of the second transimpedance amplifier.

29. The apparatus of claim 28, wherein the first and second local oscillation signals have a duty cycle of about 25%.

30. An electronic device comprising:
a receive path to receive and process a wireless signal, the receive path comprising:
an input resistor having a first end and a second end, the first end being configured to receive an input signal;
a switch located downstream of the input resistor in the receive path, the switch having a first terminal and a second terminal, the first terminal being electrically coupled to the second end of the input resistor, wherein the switch is configured to receive the input signal from the input resistor, and to selectively pass the input signal at least partially in response to a local oscillation signal;
a transimpedance amplifier having an input and an output, the input being electrically coupled to the second terminal of the switch; and
a feedback resistor coupled between the input and output of the transimpedance amplifier.

31. The device of claim 30, wherein the transimpedance amplifier has another input and another output; and
wherein the receive path further comprises:
another switch having a first terminal and a second terminal, the first terminal of the other switch being electrically coupled to the second end of the input resistor, the second terminal of the other switch being electrically coupled to the other input of the transimpedance amplifier, wherein the other switch is configured to receive the input signal from the input resistor, and pass the input signal at least partially in response to another local oscillation signal; and
another feedback resistor coupled between the other input and the other output of the transimpedance amplifier.

32. The device of claim 30, wherein the input resistor comprises a variable or programmable resistor.

33. The device of claim 30, wherein the receive path further comprises a local oscillator buffer configured to pass the local oscillation signal to the switch.

34. A method comprising:
processing an input signal through a front end of a radio frequency (RF) receive path, wherein processing the input signal comprises:
passing the input signal through a front-end resistor to generate a passed input signal;
mixing the passed input signal with a local oscillation signal to generate a mixed signal, wherein mixing is performed by a passive mixer;
amplifying the mixed signal, using a transimpedance amplifier having an input and an output, to generate an amplified signal at the output; and
providing the amplified signal to the input of the transimpedance amplifier through a feedback resistor;
wherein the front end has a gain based at least partly on a ratio of the resistance of the feedback resistor to the resistance of the front-end resistor, and
wherein the gain is substantially temperature insensitive.

35. The method of claim 34, further comprising varying the resistance of the front-end resistor to adjust the gain of the front end.

36. The method of claim 35, wherein the front-end resistor comprises a plurality of unit resistors, and wherein varying the resistance of the front-end resistor comprises varying the number of unit resistors through which the input signal is passed.

37. The method of claim 36, further comprising electrically coupling a voltage reference to one or more of the unit resistors, through which the input signal is not passed, such that input impedance viewed toward the front end is substantially constant.

38. The method of claim 35, wherein the front end comprises a plurality of resistor/mixer segments, wherein each of the segments comprises:
a resistor configured to receive the input signal;
a local oscillator buffer configured to buffer the local oscillation signal;
a passive mixer located downstream of the resistor in the segment, the passive mixer being configured to mix the input signal with the local oscillation signal from the local oscillator buffer in the segment, and to provide the mixed signal to the transimpedance amplifier,
wherein varying the resistance of the front-end resistor comprises varying the number of segments through which the input signal is passed.

39. The method of claim 38, wherein varying the number of segments comprises selectively switching on the local oscillators in the segments.

40. The method of claim 35, further comprising passing the input signal through an input matching network before providing the input signal to the front end,
wherein the input matching network comprises an input node, an output node, and a variable resistor electrically coupled to the output node of the input matching network,
wherein the method further comprises varying the resistance of the variable resistor of the input matching network such that input impedance viewed from the input node of the input matching network toward the front end is substantially constant.

41. The method of claim 34, further comprising:
transmitting a radio frequency (RF) signal through a transmit path;
obtaining a signal indicative of the power of the RF signal from a portion of the transmit path; and
providing the signal to be processed through the front end of the RF receive path.

* * * * *